(12) United States Patent
Zhao et al.

(10) Patent No.: US 11,711,121 B2
(45) Date of Patent: *Jul. 25, 2023

(54) WIRELESS COMMUNICATION METHOD AND WIRELESS COMMUNICATION DEVICE

(71) Applicant: Sony Group Corporation, Tokyo (JP)

(72) Inventors: Peiyao Zhao, Beijing (CN); Zhaocheng Wang, Beijing (CN); Xudong Zhu, Beijing (CN); Jinhui Chen, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 263 days.

This patent is subject to a terminal disclaimer.

(21) Appl. No.: 17/234,834

(22) Filed: Apr. 20, 2021

(65) Prior Publication Data

US 2021/0242912 A1 Aug. 5, 2021

Related U.S. Application Data

(63) Continuation of application No. 16/693,371, filed on Nov. 25, 2019, now Pat. No. 11,070,260, which is a (Continued)

(30) Foreign Application Priority Data

Jan. 7, 2016 (CN) .......................... 201610009346.7

(51) Int. Cl.
*H04B 7/06* (2006.01)
*H04B 7/0456* (2017.01)
(Continued)

(52) U.S. Cl.
CPC ......... *H04B 7/0456* (2013.01); *H04B 7/0626* (2013.01); *H04B 7/0695* (2013.01);
(Continued)

(58) Field of Classification Search
None
See application file for complete search history.

(56) References Cited

U.S. PATENT DOCUMENTS 7,035,661 B1 4/2006 Yun
7,299,071 B1 11/2007 Barratt et al.
(Continued)

FOREIGN PATENT DOCUMENTS

CN 101079662 A 11/2007
CN 101098176 A 1/2008
(Continued)

OTHER PUBLICATIONS

International Search Report dated Mar. 23, 2017 in PCT/CN2016/112967 filed Dec. 29, 2016.
(Continued)

*Primary Examiner* — Rebecca E Song
*Assistant Examiner* — Emmanuel K Maglo
(74) *Attorney, Agent, or Firm* — Xsensus LLP

(57) ABSTRACT

A wireless communication method and a wireless communication device. The method comprises: a sending side device generating a common sequence so as to send to a plurality of receiving side devices; each of the plurality of receiving side devices determining a first analogue weight parameter according to a receiving situation of the common sequence, and determining an antenna configuration for sending a pre-determined pilot frequency signal corresponding to the receiving side device according to the determined first analogue weight parameter so as to send the pre-determined pilot frequency signal to the sending side device; and the sending side device determining a second analogue weight parameter regarding the receiving side device according to a receiving situation of the pre-determined pilot frequency signal, and determining an antenna configuration
(Continued)

for sending data regarding the receiving side device according to the determined second analogue weight parameter so as to send the data to the receiving side device.

34 Claims, 9 Drawing Sheets

Related U.S. Application Data continuation of application No. 15/766,967, filed as application No. PCT/CN2016/112967 on Dec. 29, 2016, now Pat. No. 10,530,434.

(51) Int. Cl.
  *H04B 7/08* (2006.01)
  *H04B 7/0404* (2017.01)
(52) U.S. Cl.
  CPC .......... *H04B 7/088* (2013.01); *H04B 7/0862* (2013.01); *H04B 7/0868* (2013.01); *H04B 7/0897* (2013.01); *H04B 7/0404* (2013.01); *H04B 7/0617* (2013.01)

(56) References Cited

U.S. PATENT DOCUMENTS

| 9,252,864 | B2 | 2/2016 | Seol et al. | |
|---|---|---|---|---|
| 2007/0092019 | A1 | 4/2007 | Kotecha et al. | |
| 2008/0204319 | A1 | 8/2008 | Niu et al. | |
| 2009/0058724 | A1 | 3/2009 | Xia et al. | |
| 2010/0008268 | A1 | 1/2010 | Whinnett et al. | |
| 2010/0008406 | A1* | 1/2010 | Sawai | H04L 25/03006 455/75 |
| 2010/0215027 | A1 | 8/2010 | Liu et al. | |
| 2012/0178381 | A1 | 7/2012 | Jiang et al. | |
| 2012/0182895 | A1 | 7/2012 | Jwa | |
| 2013/0322280 | A1 | 12/2013 | Pi | |
| 2014/0187168 | A1 | 7/2014 | Seol et al. | |
| 2014/0210668 | A1 | 7/2014 | Wang et al. | |
| 2014/0241242 | A1 | 8/2014 | Josiam et al. | |
| 2015/0009951 | A1 | 1/2015 | Josiam et al. | |
| 2015/0023317 | A1 | 1/2015 | Yokomakura et al. | |
| 2015/0063201 | A1* | 3/2015 | Kim | H04B 7/0617 370/316 |
| 2015/0063207 | A1 | 3/2015 | Nakamura et al. | |
| 2015/0180561 | A1* | 6/2015 | Jindal | H04B 7/0456 375/267 |
| 2015/0244433 | A1 | 8/2015 | Jindal | |
| 2015/0289147 | A1 | 10/2015 | Lou et al. | |
| 2015/0333894 | A1 | 11/2015 | Wang et al. | |
| 2016/0241323 | A1 | 8/2016 | Ko et al. | |
| 2016/0269157 | A1 | 9/2016 | Soriaga et al. | |
| 2017/0279504 | A1 | 9/2017 | Chen et al. | |
| 2017/0288834 | A1 | 10/2017 | Yuan et al. | |
| 2017/0317735 | A1* | 11/2017 | De Carvalho | H04B 7/0851 |
| 2018/0310283 | A1* | 10/2018 | Deenoo | H04W 72/23 |

FOREIGN PATENT DOCUMENTS

| CN | 102281593 A | 12/2011 |
|---|---|---|
| CN | 103281110 A | 9/2013 |
| CN | 104539401 A | 4/2015 |
| WO | 2007/004461 A1 | 1/2007 |
| WO | 2012/026601 A1 | 3/2012 |
| WO | 2013/145046 A1 | 10/2013 |
| WO | 2014/139174 A1 | 9/2014 |
| WO | 2014/161166 A1 | 10/2014 |
| WO | WO-2015065152 A1 | 5/2015 |
| WO | 2015/184927 A1 | 12/2015 |

OTHER PUBLICATIONS

Extended European Search Report dated Nov. 7, 2018 in European Application No. 16883462.0-1220.
Office Action dated May 15, 2020 in European Patent Application No. 16 883 462.0, 5 pages.
Chinese Office Action dated Dec. 24, 2020, issued in Chinese Patent Application No. 201680074945.5.

* cited by examiner

WIRELESS COMMUNICATION METHOD AND WIRELESS COMMUNICATION DEVICE

CROSS-REFERENCE TO RELATED APPLICATIONS

The present application is a continuation of U.S. application Ser. No. 16/693,371, filed Nov. 25, 2019, which is a continuation of U.S. application Ser. No. 15/766,967, filed Apr. 9, 2018 (now U.S. Pat. No. 10,530,434), which is based on PCT filing PCT/CN2016/112967, filed on Dec. 29, 2016, which claims priority of Chinese Patent Application No. 201610009346.7, filed on Jan. 7, 2016, the entire contents of each are incorporated herein by reference as a portion of the application.

FIELD

The present disclosure relates to a wireless communication method and a wireless communication device, and particularly to a beamforming training method for a multi-user massive antenna system and a device using the method.

BACKGROUND

In recent years, millimeter-wave technology and massive multi-input multi-output (MIMO) technology are considered as key technology of the future 5th generation mobile communication (5G), and have attracted extensive attention. The millimeter-wave frequency band includes a large amount of available spectrum resources, which can meet increasing requirements for business traffic. In addition, since the wavelength of the millimeter wave is short, hundreds or thousands of antennas can be arranged in a small spatial range, which facilitates application of the massive antenna technology in an actual system.

FIG. 1 is a schematic diagram showing a single-base-station multi-user millimeter wave massive antenna system. As shown in FIG. 1, a base station 100 is provided with M antennas, and is used to serve K user equipments UE 1 to UE K. Each of the K user equipments is provided with N antennas. In a conventional fully-digital precoding architecture (one radio frequency link is connected to only one antenna unit), data for the K user equipments is mapped into M radio frequency links and M antenna units using a full-digital precoding matrix $W \in C^{M \times K}$. In this way, an optimal precoding performance can be obtained. M radio frequency links are required in the fully-digital precoding architecture, which results in a problem such as high hardware complexity and large power consumption. Therefore, a fully-connected hybrid precoding architecture is employed in the system shown in FIG. 1. In this architecture, data streams for the K user equipments are mapped into K radio frequency links (K<M) by a digital precoder 110 using a digital precoding matrix B ($B \in C^{K \times K}$). Signal of each radio frequency link is up-converted, and then is conveyed to M antennas via an analog phase shifting network 120 for transmission. Since each radio frequency link corresponding to multiple phase shifters and multiple antenna units enables a single radio frequency link to form a beam, the hardware cost in the fully-connected hybrid precoding architecture may be greatly reduced, compared with the fully-digital precoding architecture in which multiple radio frequency links form a beam. Values of the phase shifters in the analog phase shifting network 120 constitute an analog precoding matrix F. Since a phase rather than an amplitude of a signal is changed by the phase shifter, the analog precoding matrix $F \in C^{M \times K}$ meets the constraint $|[F]_{m,n}|^2 = M^{-1}$. Accordingly, a signal received by the user equipments UE 1 to UE K at an antenna is conveyed to one or more radio frequency links via a phase shifting network 140. In the hybrid precoding architecture, a downlink signal transmission model may be expressed as:

$$y_k = w_k^T H_k FBx + w_k^T n_k,$$

where $y_k$ denotes a signal received by the k-th user equipment, $H_k$ denotes a downlink channel matrix between the k-th user equipment and the base station 100, F and B denote an analog precoding matrix and a digital precoding matrix, respectively, $f_k$ in the k-th column of the analog precoding matrix F denotes an analog transmitting weight vector (for example, used for setting phases of multiple phase shifters connected to the k-th radio frequency link) for the k-th user equipment, $w_k$ denotes a receiving weight vector of the k-th user equipment, $n_k$ denotes Gaussian white noise, and x denotes data transmitted to the K user equipments UE 1 to UE K. Due to limitation regarding device, the analog transmitting weight vector $f_k$ and the receiving weight vector $w_k$ are normally selected from a predefined codebook, and particularly selected from a codebook Fc of the base station 100 and a codebook Wc of the user equipment (UE), respectively.

In the hybrid precoding architecture, the analog transmitting weight vector and the receiving weight vector are normally designed separately from the digital precoding matrix B, to reduce calculation complexity. A process of selecting an optimal analog transmitting weight vector/receiving weight vector for each user equipment from the codebooks is referred to as beamforming training. The beamforming training may be performed according to a criterion of maximizing the received power of the user. The criterion is expressed as follows:

$$\{w_{k,opt}, f_{k,opt}\} = \arg\max \|w_k^T H_k f\| \text{ s.t. } w \in W_c, f \in F_c,$$

where $\{w_{k,opt}, f_{k,opt}\}$ denotes an optimal downlink receiving weight vector/an optimal downlink transmitting weight vector for the k-th user equipment.

After the analog receiving weight vector/transmitting weight vector $\{w_{k,opt}, f_{k,opt}\}$ are obtained, a downlink equivalent channel $H_{eq} \in C^{K \times K}$ may be obtained, where $[H_{eq}]_{i,j} = w_{i,opt}^T H_i f_{j,opt}$. According to the random matrix theory, $H_{eq}$ is a principally diagonally dominant matrix in a case that the number of antennas of the base station 100 is much greater than the number of user equipments (UEs) (that is, M>>K). Therefore, the digital precoding matrix B may be designed using a linear digital precoding algorithm such as the zero-forcing algorithm (ZF). The digital precoding matrix B is expressed as follows:

$$B = H_{eq}^H (H_{eq} H_{eq}^H)^{-1} \Lambda,$$

where Λ denotes a diagonal matrix and is used to allocate transmit power among the user equipments.

A conventional beamforming training mechanism mainly includes physical channel estimation, exhaustive search, multi-layer feedback and one-time feedback.

With the physical channel estimation mechanism, a downlink physical channel $H_k \in C^{N \times M}$ is estimated directly based on a pilot, and the user equipment calculates an optimal transmitting/receiving weight vector based on the estimated physical channel, and feeds back the transmitting weight vector to the base station. In the millimeter-wave system, the base station and the user equipment are each provided with a large number of antennas. Therefore, complexity of channel estimation is high. Also, since the pilot is not beamformed, the received signal-to-noise ratio (SNR) is low and the accuracy of channel estimation is low.

All possible transmitting/receiving weight vectors are searched for with the exhaustive search mechanism. The user equipment measures channel quality based on each pair of transmitting/receiving weighing vectors, to select an optimal pair of weight vectors, and feeds back the transmitting weight vector to the base station. The exhaustive search mechanism may realize optimal performance, however, the complexity is very high.

With the multi-layer feedback mechanism, a training process is respectively performed on multiple layers based on a multi-layer codebook designed in advance, and exhaustive search is performed in each of the multiple layers. Since the number of selectable codewords in each layer is small, the complexity is reduced. The transmitting weight vectors are fed back to the base station for multiple times in the multi-layer feedback mechanism, which results in occupying a large amount of resources additionally. In addition, since the training processes are different for different user equipments, training is performed for all the user equipments separately successively, which results in high overall complexity.

Beamforming training is divided into two procedures in the one-time feedback mechanism. Firstly, the base station searches for all possible transmitting weight vectors, and the user equipment receives a signal with an omnidirectional beam and estimates channel quality, and selects an optimal transmitting weight vector and feeds the optimal transmitting weight vector back to the base station. Secondly, the base station transmits a weight vector fixedly, and the user equipment searches for an optimal receiving weight vector. As compared with the exhaustive search mechanism, the complexity of the one-time feedback mechanism is reduced, however, performance loss is caused, and the complexity is increased with the increase in the number of user equipments.

To sum up, the main problem in the conventional beamforming training mechanism is high complexity, and the complexity of the beamforming training in the millimeter-wave system affects a communication establishing time, which is an important indicator in the mobile communication system. Therefore, a rapid beamforming training mechanism for multi-user millimeter-wave massive antenna system is required.

The above illustration is provided to better understand the embodiments of the present disclosure. However, it should be understood that it does not mean that the above illustration belongs to the conventional technology, and the above illustration may include content in the embodiments of the present disclosure.

SUMMARY OF INVENTION

In order to solve the above problem, a receiving-side device in a communication system is provided in the present disclosure. The receiving-side device includes one or more processors configured to: determine analog weight parameters for multiple antennas of the receiving-side device based on reception of a common sequence from a transmitting side by the receiving-side device; and determine, based on the analog weight parameters, antenna configuration for transmitting a predetermined pilot signal corresponding to the receiving-side device, so as to transmit the predetermined pilot signal to the transmitting side A transmitting-side device in a communication system is further provided in the present disclosure. The transmitting-side device includes one or more processors configured to: generate a common sequence to be transmitted to multiple receiving-side devices; with respect to each of the multiple receiving-side devices, determine analog weight parameters for multiple antennas of the transmitting-side device based on reception of a predetermined pilot signal from the receiving-side device, wherein the predetermined pilot signal is transmitted by the receiving-side device based on multi-antenna transmitting weight parameters of the receiving-side device, and the multi-antenna transmitting weight parameters are determined by the receiving-side device based on reception of the common sequence.

A training method in a communication system is further provided in the present disclosure. The method includes: generating, by a transmitting-side device, a common sequence to be transmitted to multiple receiving-side devices; determining, by each of the multiple receiving-side devices, first analog weight parameters based on reception of the common sequence; determining, by each of the multiple receiving-side devices, antenna configuration for transmitting a predetermined pilot signal corresponding to the receiving-side device based on the determined first analog weight parameters, to transmit the predetermined pilot signal to the transmitting-side device; determining, by the transmitting-side device, second analog weight parameters for the receiving-side device based on reception of the predetermined pilot signal; and determining, by the transmitting-side device, antenna configuration for transmitting data directed to the receiving-side device based on the determined second analog weight parameters, to transmit the data to the receiving-side device.

BRIEF DESCRIPTION OF THE DRAWINGS

The present disclosure may be better understood with reference to the description given hereinafter in conjunction with the drawings, in which same or similar reference numerals are used to represent the same or similar components throughout the drawings. The drawings together with the following detailed description are included in this specification and form a part of this specification, and are used to further illustrate the preferred embodiments of the present disclosure and to explain the principles and advantages of the present disclosure. In the drawings.

DETAILED DESCRIPTION OF THE EMBODIMENTS

Figure 1:
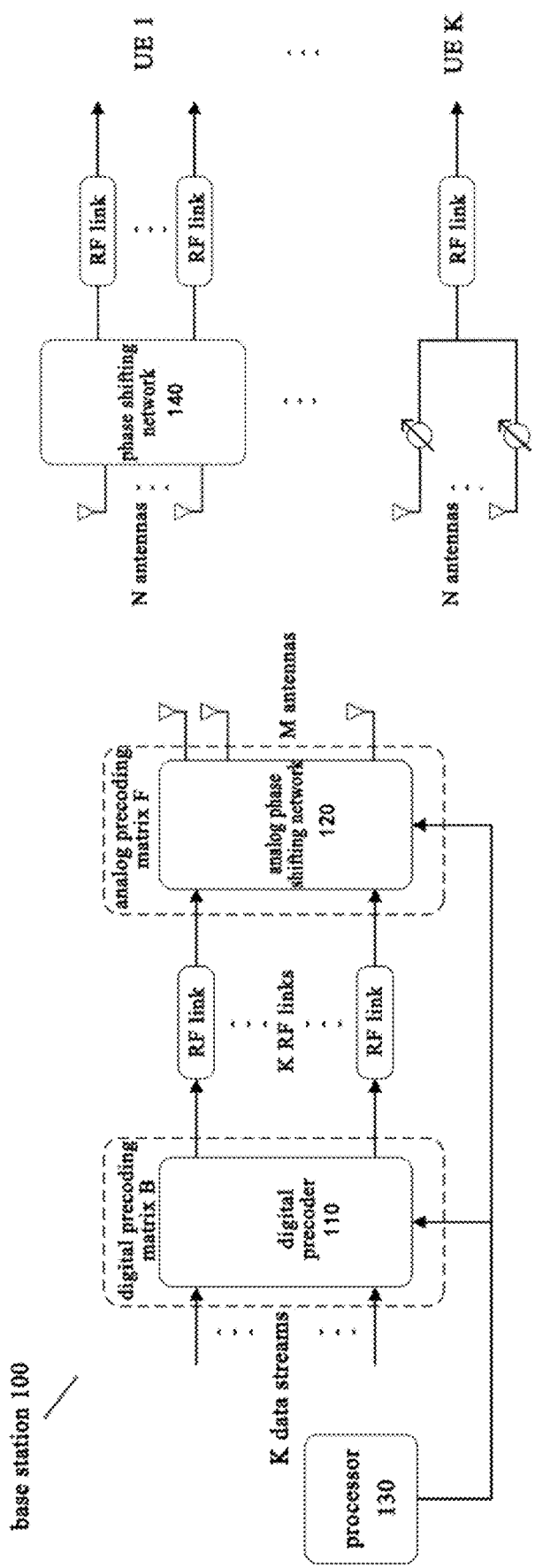
FIG. 1 is a schematic structural block diagram of a single-base-station multi-user millimeter-wave massive antenna communication system to which the present disclosure is applied.

FIG. 1 is a schematic structural block diagram of a communication system to which the present disclosure is applied. As shown in FIG. 1, in a base station 100, K user data streams are inputted into a baseband digital precoder 110, and the digital precoder 110 performs digital precoding on the K data streams using a digital precoding matrix B, to map the K data streams into K radio frequency (RF) links with different weight coefficients. Interference between different data streams can be eliminated through the digital precoding in a case that multiple data streams multiplex the same physical transmission resource. It should be noted that since different beams can be transmitted separately in space by analog precoding, interference between different transmission streams can be reduced at some extent, and the digital precoding is not necessary processing in the present disclosure. In order to reduce the complexity of the system or reduce the cost, the digital precoder may be omitted in some embodiments. In addition, the digital precoding is performed in the baseband, therefore, the digital precoder may be implemented by for example a baseband processor, and is also referred to as baseband precoder sometimes. In addition, analog precoding is implemented under the control of a processing circuit in radio frequency, and is also referred to as analog beamforming sometimes.

It should be noted that beamforming is known in the existing conventional technology. However, the beamforming is mostly discussed in an architecture in which the radio frequency links are in one-to-one correspondence with the antenna units, and there is no constraint regarding device, and from the perspective of implementation it is not necessary to perform training repeatedly for selecting a codeword from a fixed codebook for actual transmission. In the conventional technology, beamforming is performed only at a base station side, the user equipment only receives a signal passively, and does not adjust antenna configuration (for example a radio frequency device). In the present disclosure, however, a radio frequency link of the user equipment corresponds to multiple phase shifter and multiple antenna units, and the user equipment adopts a particular antenna configuration scheme when receiving or transmitting a signal, to cooperate with the base station, thereby implementing high-quality signal transmission.

After the digital precoding, baseband signals are up-converted, amplified and filtered in K radio frequency links, to generate radio frequency signals.

The K radio frequency links are connected to an analog phase shifting network 120, M outputs of the phase shifting network 120 are connected to M antennas respectively. Values of phase shifters in the phase shifting network 120 constitute an analog precoding matrix (or referred to as analog beamforming matrix) F. As different from the digital precoding, the received signal-to-noise ratio of the user equipment are improved and channel path fading is overcome through the analog beamforming, therefore, different beams are generated for different user equipments generally.

A processor 130 is configured to generate or determine the digital precoding matrix B and the analog precoding matrix F. That is, the processor 130 is configured to control digital precoding processing and configuration of the phase shifters in the phase shifting network 120. It should be understood that the processor 130 in the present disclosure may be implemented as one or more high-layer controllers, a baseband processor and other processor, and different processors may be configured to generate the digital precoding matrix B and the analog precoding matrix F, respectively.

Figure 2:
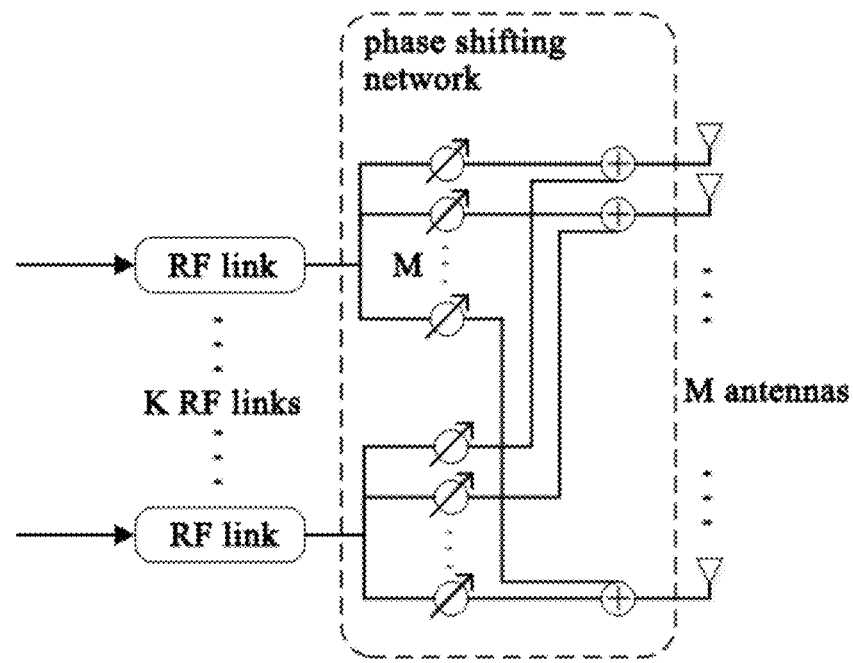
FIG. 2 schematically shows structure of a full-connected phase shifting network of a base station.
Figure 3:
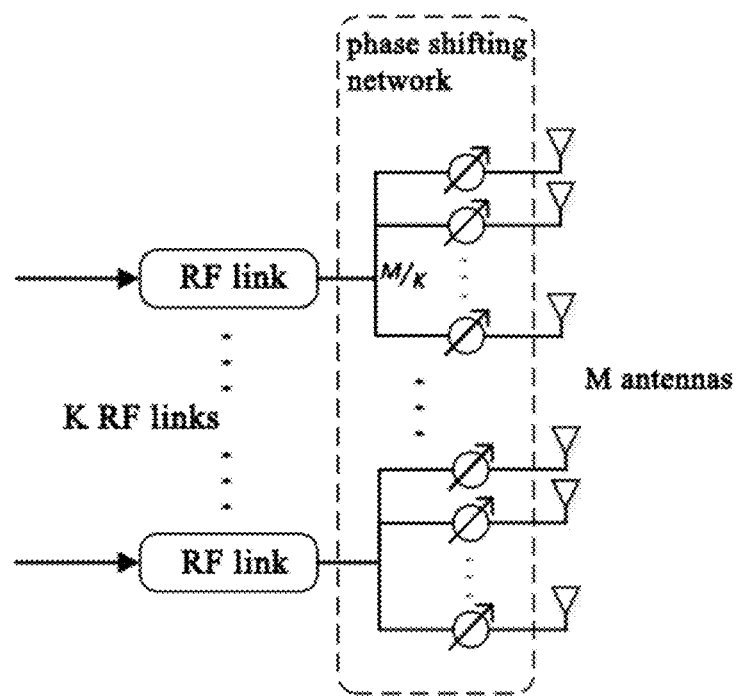
FIG. 3 schematically shows structure of a sub-connected phase shifting network of a base station.

Typically, the phase shifting network 120 includes a full-connected phase shifting network type and a sub-connected phase shifting network type. FIG. 2 schematically shows the structure of the full-connected phase shifting network. As shown in FIG. 2, each radio frequency link is connected to M phase shifters, signals outputted from every K (K<M) phase shifters are added by an adder and then connected to one antenna unit. FIG. 3 schematically shows the structure of the sub-connected phase shifting network. As shown in FIG. 3, each radio frequency link is connected to M/K phase shifters, and each phase shifter is connected to one antenna unit.

Figure 4:
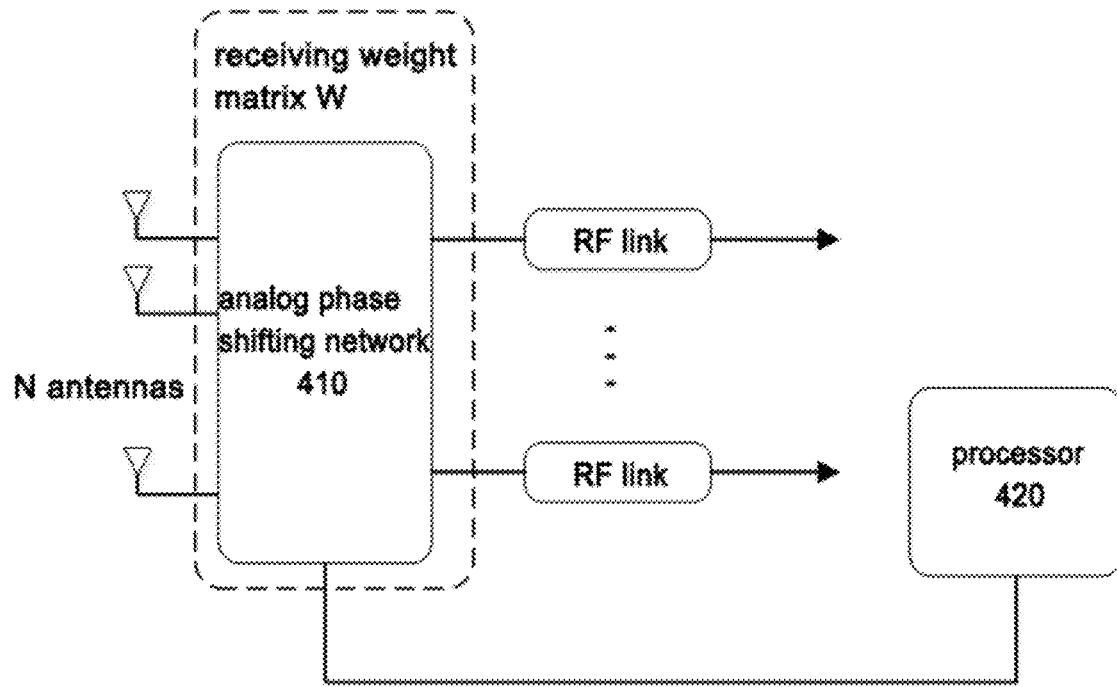
FIG. 4 schematically shows structure of a user equipment provided with multiple radio frequency links.

FIG. 1 is a schematic diagram showing each user equipment (UE) provided with N receiving antennas, in practice, the user equipments (UEs) may be provided with different numbers of antennas, and the present disclosure is not limited thereto. FIG. 4 shows a structure of the user equipment (UE) in detail. As shown in FIG. 4, signals received through N antenna units is connected to multiple radio frequency links (the number of radio frequency links is less than the number of antenna units) via a phase shifting network 410, and then are filtered, amplified, down-converted to obtain a baseband received signal (not shown). The phase shifting network 410 has a similar structure as the phase shifting network 120 at the base station side. Values of phase shifters in the phase shifting network 410 constitute an analog receiving weight matrix W for the user equipment (UE). In addition, similar to the base station side, the processor 420 configures the receiving weight matrix W, that is, configures the values of the phase shifters in the phase shifting network 410.

Figure 5:
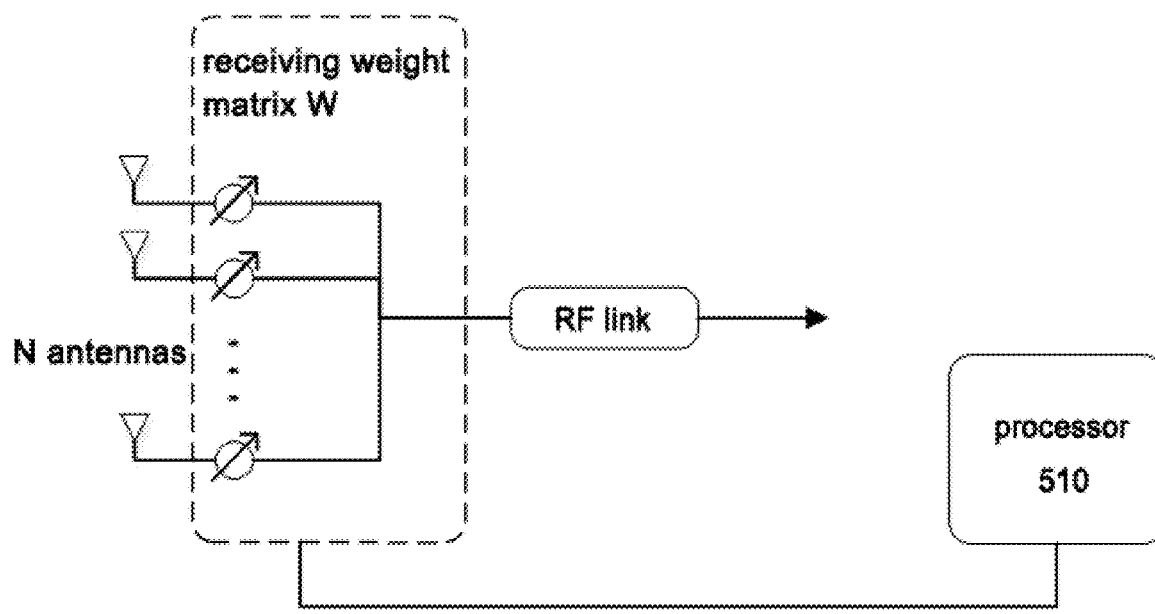
FIG. 5 schematically shows structure of a user equipment provided with a single radio frequency link.

In addition, FIG. 5 shows another structure of the user equipment (UE), which is simpler as compared with the structure shown in FIG. 4. In FIG. 5, the user equipment includes only one radio frequency link, and signals received through N antennas are added and outputted to the radio frequency link, without the need for the phase shifting network. In this case, values of the N phase shifters connected to the N antennas constitute analog receiving weight vectors W for the user equipment (UE). Similarly, the processor 510 configures the values of the N phase shifters, that is, configures the receiving weight vectors W.

In an example of the present disclosure, one weight vector corresponds to one value mode of the multiple phase shifters, an element of the weight vector indicates phase values of a set of phase shifters, and the weight matrix includes multiple weight vectors for multiple radio frequency links. In addition, all available weight vectors constitute a beamforming codebook. In other words, each weight vector corresponds to one codeword in the beamforming codebook.

The structure of the communication system and the structures of the base station and the user equipment in the present disclosure are introduced above in conjunction with FIG. 1 to FIG. 5. As described above, the received signal corresponding to the k-th data stream (it should be noted that the user equipment provided with multiple radio frequency links may receive multiple data streams) at the base station side may be expressed as:

$$y_k = w_k^T H_k F B x + w_k^T n_k,$$

where $H_k$ denotes a downlink channel matrix corresponding to the k-th data stream between the user equipment and the base station. $B \in C^{K \times K}$ denotes a digital precoding matrix, and usually the digital precoding matrix B is a diagonally dominant matrix, that is, a value of a diagonal element is large. In this way, after the digital precoding, a signal in the k-th radio frequency link mainly comes from the k-th data stream. $F \in C^{M \times K}$ denotes an analog precoding matrix, the k-th column $f_k$ of the analog precoding matrix F denotes an analog transmitting weight vector for the k-th radio frequency link (which is used to mainly carry the k-th data stream). In the full-connected phase shifting network structure shown in FIG. 2, since each radio frequency link is connected to all antennas, therefore, all elements of the vector $f_k$ is non-zero. In the sub-connected phase shifting network structure shown in FIG. 3, since each radio frequency link is connected to only a portion of the antennas, only the $$\left((k-1) \cdot \frac{M}{K} + 1\right)^{-th}$$

element of the $$\left(k \cdot \frac{M}{K}\right)^{-th}$$

element of the vector $f_k$ are non-zero, and the other elements are zero.

In addition, $w_k$ denotes an analog receiving weight vector of the user equipment for the k-th data stream. In a case that the phase shifting network 410 at the user equipment side is the full-connected phase shifting network or the sub-connected phase shifting network, the vector $w_k$ is similar to the above vector $f_k$.

In addition, x denotes a signal transmitted by the base station corresponding to K data streams, and $n_k$ denotes Gaussian white nose.

As described above, due to limitation regarding device constraint, the analog transmitting weight vector $f_k$ and the analog receiving weight vector $w_k$ must be selected from a predefined codebook. That is, only a certain codeword from the predefined codebook can be used. In the present disclosure, the codebook at the base station side is defined as Fc, and the codebook at the user equipment side is defined as Wc. In particular, in the sub-connected phase shifting network structure, the codebook refers to a set of all possible values of non-zero elements in the weight vector.

A flow of beamforming training in the present disclosure is described in detail below in conjunction with FIG. 6.

Figure 6:
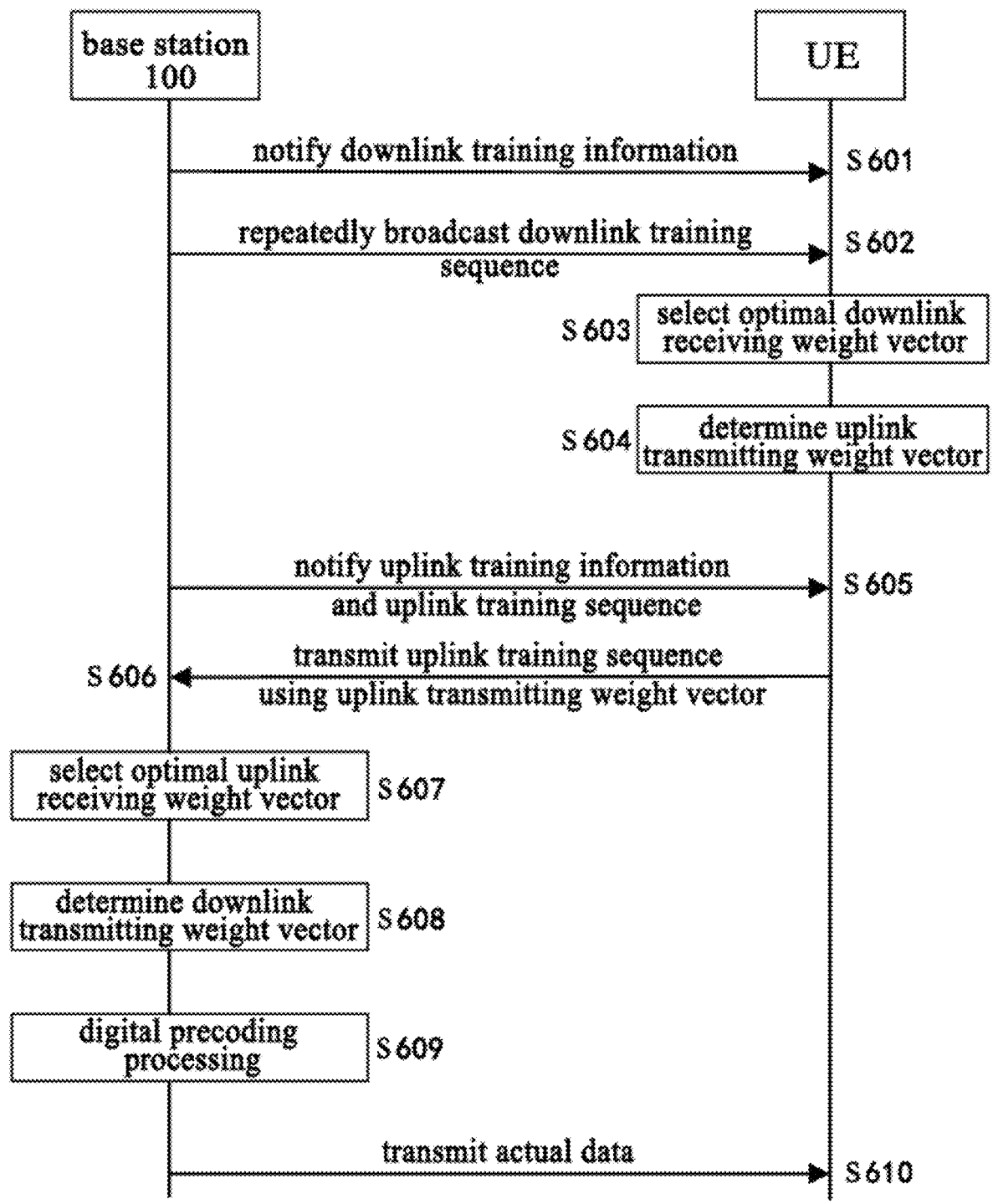
FIG. 6 is a flow chart of an example of beamforming training in the present disclosure.

As shown in FIG. 6, in step S601, the base station 100 notifies all user equipments (UEs) served by the base station of downlink training information through for example a broadcast channel. The downlink training information may include for example a time period for transmitting a downlink training sequence (such as pilot signal), and the number of times for transmitting the downlink training sequence and the like. The downlink training sequence is generated by the base station 100 (for example, the processor 130), and is transmitted to all user equipments (UEs) from the base station 100 in step S602. For example, in a case that the present disclosure is applied to a Long Term Evolution Advanced (LTE-A) system, the downlink training sequence may be a channel state information reference signal (CSI-RS), a common reference signal (CRS), a demodulation reference signal (DMRS) and the like, and the broadcast channel may be for example a broadcast control channel (BCCH). In an example, in a case that the downlink training information includes the time period for transmitting a CSI-RS and includes information indicating that the CSI-RS is transmitted only in particular subframes, the downlink training information may not include the number of times for transmitting the CSI-RS because a definite number of the particular subframes are included in the time period.

In step S602, the base station 100 broadcasts the downlink training sequence (CSI-RS) to all of the user equipments (UEs) for multiple times using an omnidirectional beam $f_{omni}$. The omnidirectional beam $f_{omni}$ is defined as an analog transmitting weight vector meeting $|\alpha_{BS}(\theta, \varphi)^H f_{omni}|=C$ where $\alpha_{BS}(\theta, \varphi)$ denotes a response vector for transmission antenna of the base station, $\theta$ and $\varphi$ denote angle of arrival in the horizontal direction and angle of arrival in the vertical direction, respectively, and C denotes a constant.

For a downlink training sequence transmitted by the base station 100, the user equipment (UE) may estimate an equivalent channel coefficient in a case that a certain codeword in the codebook We is taken as the analog receiving weight vector. For another downlink training sequence broadcasted by the base station 100, the user equipment may estimate an equivalent channel in a case that another codeword is taken as the analog receiving weight vector. In this way, since the number of times (for example, P) for transmitting the downlink training sequence by the base station is equal to the number of codewords in the codebook Wc (that is, the size of the codebook) of the user equipment (UE), the user equipment can estimate equivalent channels in a case of using all codewords in the codebook Wc by receiving the downlink training sequences transmitted for P times.

Figure 7:
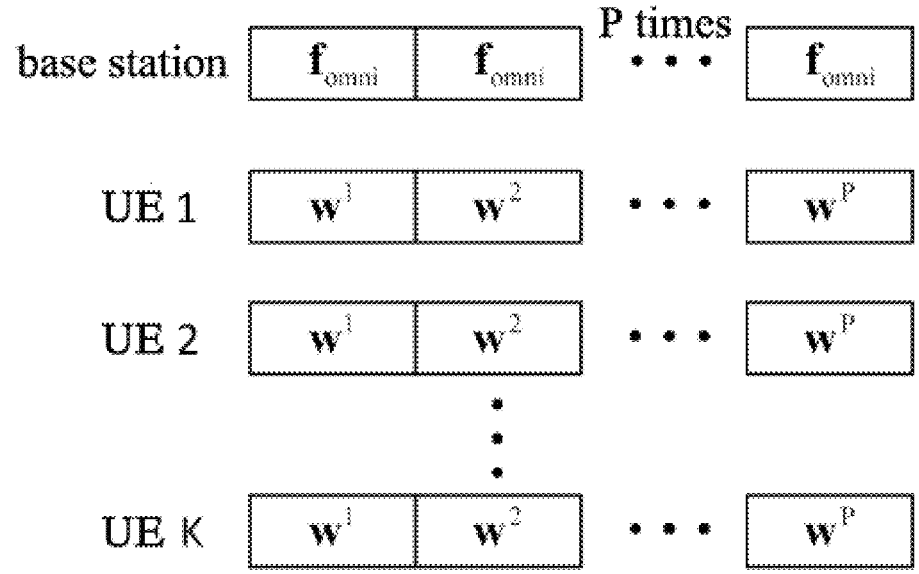
FIG. 7 is a schematic diagram illustrating downlink training in the present disclosure.

Reference is made to FIG. 7, which shows that the base station 100 broadcasts the downlink training sequence to the user equipments UE 1 to UE K for P times using the omnidirectional beam $f_{omni}$. For the downlink training sequence broadcasted for the first time, the user equipments UE 1 to UE K estimate equivalent channel coefficients in a case that codeword w' is taken as a receiving weight vector, respectively. For the downlink training sequence broadcasted for the second time, the user equipments UE 1 to UE K estimate equivalent channel coefficients in a case that codeword $w^2$ is taken as a receiving weight vector, respectively, and so forth, until estimation is performed for P codewords in the codebook Wc. It should be understood that, in a case that the sizes of codebooks Wc of multiple user equipments are different from one another, the base station 100 determines the number of times for repeatedly broadcasting the training sequence based on for example the size of the codebook of the user equipment having the maximum size of codebook, so as to ensure that all user equipments can perform complete estimation.

In addition, the user equipment having multiple radio frequency links may perform estimation for one codeword using each of the radio frequency lines. Therefore, estimation may be performed for multiple codewords simultaneously upon receiving one downlink training sequence broadcasted by the base station 100. In theory, the base station 100 may reduce the number of times for repeatedly transmitting the downlink training sequence in this case. In practice, since both the user equipment having a single radio frequency link and the user equipment having multiple radio frequency links exist, the base station 100 still needs to repeatedly broadcast the downlink training sequence based on the size P of the codebook of the user equipment, so as to ensure that the user equipment having the single radio frequency link performs complete estimation.

After completing estimation of the equivalent channels for all codewords, the user equipment (UE) selects based on the estimation results a downlink receiving weight vector which enables the receiving quality of the downlink training sequence to meet a predetermined condition. Preferably, the user equipment selects a receiving weight vector corresponding to the best receiving quality as a downlink receiving weight vector to be used in the communication, as in step S603 shown in FIG. 6. A criterion for selection may include: 1) a criterion of maximizing power of the received signal; and 2) a criterion of maximizing signal-to-interference ratio. These two criterions are respectively suitable to a case that the user equipment is provided with the single radio frequency link and a case that the user equipment is provided with multiple radio frequency links.

For example, in the case that the user equipment is provided with the single radio frequency link, the criterion of maximizing the power of the received signal may be expressed as:

$$\{w_{opt}\} = \arg\max \|w^T H f_{omni}\| \text{ s.t. } w \in W_c,$$

where w denotes a downlink receiving weight vector used in a case of the single radio frequency link. As described above, w is selected from the codewords of the codebook Wc. Wc denotes an analog beamforming codebook predefined in the user equipment. $H \in C^{N \times M}$ denotes a downlink channel matrix between the base station and the user equipment (N and M denote the number of antennas provided to the user equipment and the number of antennas provided to the base station, respectively), and $f_{omni}$ denotes an omnidirectional beam used by the base station.

Furthermore, based on symmetry of uplink channel characteristics and downlink channel characteristics, a value of a phase shifter connected to the single radio frequency link of the user equipment (UE) may be configured based on the above-determined $w_{opt}$, to transmit an uplink training sequence (described hereinafter) to the base station.

In a case that the user equipment is provided with multiple radio frequency links, the criterion of maximizing signal-to-interference ratio may be expressed as:

$$\{w_{j,opt}\} = \arg\max \sum_{j=1}^{N_{RF}} \log_2(1 + SIR_j),$$

$$\text{where } SIR_j = \frac{\|w_j^T H f_{omni}\|}{\sum_{i \neq j} \|w_i^T H f_{omni}\|} \text{ s.t. } w_j \in W_c,$$

$N_{RF}$ denotes the number of radio frequency links provided to the user equipment, and $w_j$ denotes an analog receiving weight vector used for the j-th radio frequency link. As described above, $w_j$ is selected from the codewords of the codebook Wc. Wc denotes the analog beamforming codebook predefined in the user equipment. $H \in C^{N \times M}$ denotes a downlink channel matrix between the base station and the user equipment, and $f_{omni}$ denotes an omnidirectional beam used by the base station.

Values of a set of phase shifters connected to the j-th radio frequency link of the user equipment (UE) may be configured based on the above-determined $w_{j,opt}$, to transmit an uplink training sequence (to be described hereinafter) to the base station. In an example, the values of respective sets of phase shifters connected to respective radio frequency links of the user equipment (UE) may be configured with $w_{j,opt}$. That is, the respective sets of phase shifters are configured in the same manner.

As an extended example, the user equipment (UE) having multiple radio frequency links may perform training with two base stations (for example a macro base station and a small base station) simultaneously through dual connectivity technology specified in the LTE-A communication protocol for example. In this case, the user equipment (UE) may obtain analog receiving weight vectors w1 and w2 for the two base stations, respectively, and then the user equipment (UE) configures values of a set of phase shifters connected to radio frequency link 1 based on the determined weight vector w1 for the base station 1, and configures values of a set of phase shifters connected to radio frequency link 2 based on the determined weight vector w2 for the base station 2, so as to implement analog beamforming transmissions with two base stations simultaneously.

After the use equipment (UE) obtains the downlink receiving weight vector for communication in step S603, the downlink training process ends.

The user equipment (UE) then calculates an uplink transmitting weight vector based on the determined downlink receiving weight vector in step S604, and transmits an uplink training sequence using the calculated uplink transmitting weight vector, to start an uplink training process. Since channel characteristics of a downlink channel and channel characteristics of an uplink channel are reciprocal in a time division duplex (TDD) system, the determined receiving weight vector may serve as an uplink transmitting weight vector of the user equipment (UE) directly. In a frequency division duplex (FDD) system, an accurate uplink transmitting weight vector may be obtained by correcting the receiving weight vector, which is described in detail hereinafter.

The base station 100 broadcasts uplink training information to all user equipments (UEs) in step S605. The uplink training information may include for example a time period for transmitting an uplink training sequence, the number of times for transmitting an uplink training sequence and the like. In an example, in a case that the uplink training information includes the time period for transmitting the uplink training sequence and includes information indicating that one uplink training sequence is transmitted in each subframe, the uplink training information may not include the number of times for transmitting the uplink training sequence because a definite number of the subframes are included in the time period. In another example, the base station notifies the user equipment of information on the radio frequency link, the beamforming codebook and the like by including it in the system information when the user equipment accesses to network. In this case, the uplink training information may not include the number of times for transmitting the uplink training sequence. In other examples, it is possible to set in advance that the uplink training will start when a predetermined time elapses after the downlink training ends, and therefore the base station 100 may not transmit the uplink training information. In addition, the base station 100 notifies the user equipment (UE) of the uplink training sequence allocated to the user equipment (UE) through a particular channel and dedicated signaling such as RRC signaling.

The user equipment (UE) transmits the uplink training sequence to the base station 100 based on the uplink transmitting weight vector obtained in step S604 and the uplink training sequence and the uplink training information obtained in step S605, as shown in step S606. In particular, the uplink training sequences used by the user equipments (UEs) are orthogonal with each other, including at least one of the training sequences being orthogonal with each other and the physical transmission resources being orthogonal with each other. The uplink training sequence may be for example orthogonal pilot signal, such as Sounding Reference Signal (SRS). In a case that the uplink training sequence is the SRS, since the user equipment performs beamforming on the SRS based on a downlink training result and transmits the SRS, downlink channel information can be fed back implicitly and more accurately while reference on resource scheduling is provided to the base station, without specialized signaling overhead for feedback.

For the uplink training sequence transmitted by each user equipment (UE), the base station 100 estimates an equivalent channel coefficient in a case that each codeword in the wordbook Fc is used as an uplink receiving weight vector, and determines based on the estimation result an uplink receiving weight vector which enables the receiving quality of the uplink training sequence to meet a predetermined condition (or to be optimum), as shown in step S607.

In particular, in a preferred example in which the base station 100 is configured with the full-connected phase shifting network, since the base station 100 is provided with multiple radio frequency links, estimation may be performed for multiple codewords simultaneously. That is, an equivalent channel is estimated in a case that one codeword is taken as the receiving weight vector in each of the radio frequency links. Therefore, the base station 100 may estimate equivalent channels for $K_{RF}$ codewords for one uplink training sequence transmitted by the user equipment (UE), where $K_{RF}$ denotes the number of radio frequency links provided to the base station 100. In this way, the size of the codebook Fc predetermined in the base station 100 is Q, and the number of times for transmitting the uplink training sequence by the user equipment (UE) is $Q/K_{RF}$ in theory.

Figure 8A:
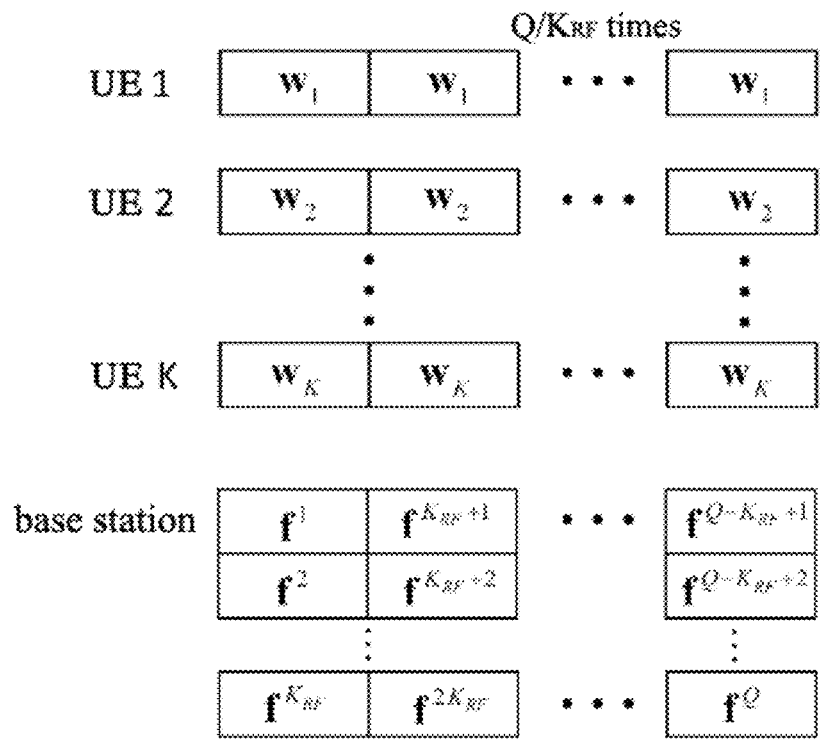
FIG. 8A and FIG. 8B are schematic diagrams illustrating uplink training in the present disclosure.

Reference is made to FIG. 8A, which shows that the user equipments UE 1 to UE K transmit uplink training sequences for multiple times using uplink transmitting weight vector $w_1$ to $w_k$ respectively corresponding to the user equipments UE 1 to UE K. For example, for an uplink training sequence transmitted by the user equipment UE 1 using a weight vector $w_1$ for the first time, the base station 100 may estimate equivalent channel coefficients for $K_{RF}$ codewords $f^1, f^2 \ldots f^{K_{RF}}$ because the base station 100 has $K_{RF}$ radio frequency links. For an uplink training sequence transmitted by the user equipment UE1 using a weight vector $w_1$ for the second time, the base station 100 may estimate equivalent channel coefficients for $K_{RF}$ additional codewords $f^{K_{RF}+1}, f^{K_{RF}+2} \ldots f^{2K_{RF}}$, and so forth, until estimation is performed for all Q codewords in the codebook Fc. For other user equipments UE 2 to UE K, the processing of the base station 100 is the same as processing of the user equipment UE 1.

The uplink training sequences transmitted by multiple user equipments UE 1 to UE K are received at antennas of the base station 100 in an overlapped manner. Since the uplink training sequences transmitted by the user equipments (UEs) are orthogonal with each other, the base station 100 can parse the sequences transmitted by the user equipments, and perform uplink training on the user equipments, respectively. In this case, resources consumed in the uplink training process are irrelevant to the number of user equipments. Therefore, it is desired that as many user equipments (UEs) as possible transmit uplink training sequences simultaneously if the number of available orthogonal pilot signals (uplink training sequences) permits, so as to save total training overhead. Preferably, in a case that the full-connected phase shifting network structure shown in FIG. 2 is used in the phase shifting network 120 of the base station 100, each of radio frequency links is connected to all antennas, and signals of all transmission paths may be received. In this case, all user equipments (UEs) served by the base station 100 may transmit the uplink training sequences simultaneously, so that the base station 100 can perform uplink training on all user equipments (UEs), and select a receiving weight vector for each of the user equipments (UEs).

Figure 8B:
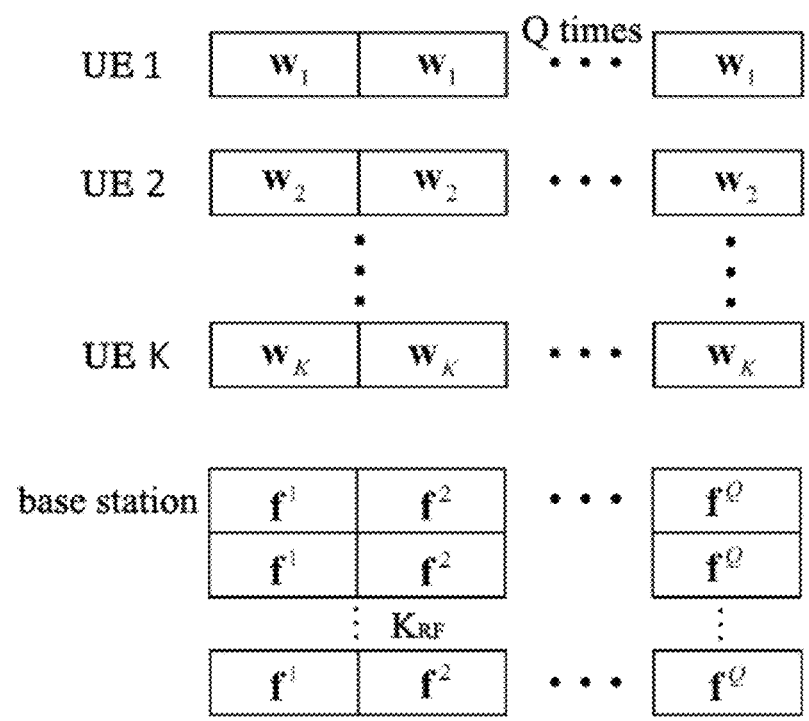

In another aspect, in a case that the sub-connected phase shifting network structure shown in FIG. 3 is used in the phase shifting network 120 of the base station 100, each of the radio frequency links of the base station 100 may be configured to receive the uplink training sequences transmitted by all user equipments (UEs) by using the same receiving weight vector, and estimate equivalent channels. As shown in FIG. 8B, for an uplink training sequence transmitted by the user equipment UE 1 using the weigh vector $w_1$ for the first time, the $K_{RF}$ radio frequency links of the base station 100 receive the uplink training sequence by using codeword $f^1$ as the receiving weight vector, and estimate equivalent channel coefficients. For the uplink training sequence transmitted by the user equipment UE 1 using the weigh vector $w_1$ for the second time, the $K_{RF}$ radio frequency links of the base station 100 receive the uplink training sequence by using codeword $f^2$, and estimate equivalent channel coefficients, and so forth, until estimation is performed for all Q codewords of the codebook Fc. Although training overhead in this case is greater than training overhead in the case that the base station 100 is provided with a full-connected phase shifting network, the case of the sub-connected phase shifting network structure has obvious advantages compared with the exhaustive search mechanism.

For the uplink training of the user equipment (UE), after estimating equivalent channels for all Q codewords in the beamforming codebook Fc, the base station 100 selects based on the estimation result an uplink receiving weight vector which enables the receiving quality of the uplink training sequence to meet a predetermined condition. A criterion for selection includes: 1) a criterion of maximizing power of the received signal; and 2) a criterion of maximizing signal-to-interference ratio. These two criterions are respectively suitable to a case that the user equipment is provided with a single radio frequency link and a case that the user equipment provided with multiple radio frequency links.

In the case that the user equipment is provided with the single radio frequency link, the criterion of maximizing power of the received signal may be expressed as:

$$\{f_{opt}\} = \arg\max \|f^T H w\| \text{ s.t. } f \in F_c,$$

where f denotes a receiving weight vector at a base station side used for an uplink training sequence transmitted by the user equipment 100. As described above, f is selected from the codewords of codebook Fc. Fc denotes an analog beamforming codebook predefined in the base station 100. $H \in C^{M \times N}$ denotes an uplink channel matrix between the user equipment (UE) and the base station 100 (N and M denote the number of antenna provided to the user equipment and the number of antenna provided to the base station, respectively), and w denotes an uplink transmitting weight vector used by the user equipment (UE).

Values of a set of phase shifters connected to a RF link corresponding the user equipment (UE) in the base station 100 may be configured based on the above-determined $f_{opt}$, to transmit data for the user equipment (UE) (to be described hereinafter).

In a case that the user equipment (UE) is provided with multiple radio frequency links, the criterion of maximizing signal-to-interference ratio may be expressed as:

$$\{f_{j,opt}\} = \arg\max \sum_{j=1}^{N_{RF}} \log_2(1 + SIR_j),$$

$$\text{where } SIR_j = \frac{\|f_j^T H w_j\|}{\sum_{i \neq j} \|f_j^T H w_i\|} \text{ s.t. } f_j \in F_c,$$

$N_{RF}$ denotes the number of radio frequency links provided to the user equipment 100, and $f_j$ denotes a receiving weight vector at the base station side used for the j-th radio frequency link of the user equipment 100. As described above, $f_j$ is selected from the codewords of codebook Fc. Fc denotes an analog beamforming codebook predefined in the base station 100. $H \in C^{M \times N}$ denotes an uplink channel matrix between the user equipment and the base station 100, and $w_j$ denotes a transmitting weight vector used by the j-th radio frequency link of the user equipment 100.

Values of a set of phase shifters connected to a radio frequency link in the base station 100 which is corresponding to the j-th radio frequency link of the user equipment (UE) may be configured based on the above-determined $f_{j,opt}$, to transmit data for the user equipment (to be described hereinafter).

The base station 100 calculates downlink transmitting weight vector for communication based on the determined uplink receiving weight vector in step S608. Since channel characteristics of an uplink channel and channel characteristics of a downlink channel are reciprocal in a time division duplex (TDD) system, the determined receiving weight vector may directly serve as a transmitting weight vector. In a frequency division duplex (FDD) system, the downlink transmitting weight vector is obtained by correcting the uplink receiving weight vector.

As described in steps S604 and S608, in the FDD system, both the user equipment (UE) and the base station 100 need to correct the determined receiving weight vector, so as to obtain transmitting weight vector, which is described below.

In general, a method for correcting the receiving weight vector is related to antenna configuration and codebook design. A correcting method is given below in the case of a normal linear uniformly-spaced antenna array and Fast Fourier Transform (FFT) codebook design.

It is assumed that wavelengths of electromagnetic waves corresponding to an uplink frequency and a downlink frequency are denoted as $\lambda_{up}$ and $\lambda_{down}$, respectively, and antenna spacing is denoted as d. FFT codebook is given according to a codebook matrix $C \in C^{N_a \times N_c}$, and each column in the matrix denotes a receiving/transmitting weight vector. $N_a$ denotes the number of antennas, and $N_c$ denotes the size of codebook. Value of an element in the i-th row and the m-th column is denoted as:

$$[C]_{i,m} = j^{\left\lfloor \frac{i \times ((m+N_c/2) \bmod N_c)}{N_c/4} \right\rfloor}.$$

Under the above condition, in a case that the downlink receiving weight vector determined by the user equipment 100 in step S603 is the ($k_{down}$)-th column of the codebook matrix, the user equipment 100 selects the ($k_{up}$)-th column in the codebook matrix as a transmitting weight vector for uplink transmission in step S604. $k_{up}$ is given in the following equation:

$$k_{up} = \begin{cases} k_{down} \cdot \frac{\lambda_{down}}{\lambda_{up}}, & k_{down} \leq N_c/2 \\ N_c - (N_c - k_{down}) \cdot \frac{\lambda_{down}}{\lambda_{up}}, & k_{down} > N_c/2 \end{cases}.$$

In addition, in a case that the uplink receiving weight vector determined by the base station 100 in step S607 is the ($k_{up}$)-th column of the codebook matrix, the base station 100 selects the ($k_{down}$)-th column in the codebook matrix as a transmitting weight vector for downlink transmission in step S608. $k_{down}$ is given in the following equation:

$$k_{up} = \begin{cases} k_{up} \cdot \frac{\lambda_{up}}{\lambda_{down}}, & k_{up} \leq N_c/2 \\ N_c - (N_c - k_{up}) \cdot \frac{\lambda_{up}}{\lambda_{down}}, & k_{up} > N_c/2 \end{cases}.$$

After the base statin 100 obtains the downlink transmitting weight vector in step S608, the uplink training process ends. The base station 100 performs digital precoding processing in step S609.

The base station 100 first estimates an equivalent channel matrix. The least square (LS) estimation for the (i, j)-th element in the equivalent channel matrix is expressed as:

$$[H_{eq}]_{i,j} = w_{i,opt}^T H_i f_{j,opt} = f_{j,opt}^T H_i^T w_{i,opt} \frac{y_j \Phi_i^H}{\Phi_i \Phi_i^H}, 1 \leq i, j \leq K,$$

where $f_{j,opt}$ denotes an uplink receiving weight vector used by the base station 100, and $y_j$ denotes a signal sequence received in a case that $f_{j,opt}$ is used by the base station 100. $w_{i,opt}$ denotes an optimal uplink transmitting vector obtained by the i-th user equipment (assuming that the user equipment is provided with a single radio frequency link) in a downlink training phase, $H_i$ denotes a downlink channel matrix between the base station and the i-th user equipment, and $\Phi_i$ denotes an orthogonal pilot used by the i-th user equipment.

The base station 100 calculates a digital precoding matrix B using the zero-forcing (ZF) algorithm. The digital precoding matrix B may be expressed as:

$$B = H_{eq}^H (H_{eq} H_{eq}^H)^{-1} \Lambda,$$

where $\Lambda$ denotes a diagonal matrix for allocating transmission power among the user equipments.

Through the above processing, the base station 100 has obtained the digital precoding matrix B, and thus can perform digital precoding on K data streams. In another aspect, the base station 100 has obtained the downlink transmitting weight vectors for all user equipments (UEs) (or radio frequency links thereof), that is, obtaining an analog precoding matrix F, and therefore the base station 100 may configures values of phase shifters in the analog phase shifting network 120. With the above configuration, the base station 100 may transmit actual data (different from the training sequence) to the user equipment (UE) in step S610. Accordingly, the user equipment (UE) may also receive the actual data using the receiving weight vector determined in step S603.

It should be noted that, although it is described in the description of the flow shown in FIG. 6 that the steps are performed by the base station 100 and the user equipment (UE) for the sake of clarity, it can be easily understood by those skilled in the art that processing or calculation in the steps may be performed by the processor 130 of the base station 100 or the processor 420, 510 of the user equipment (UE).

Figure 9:
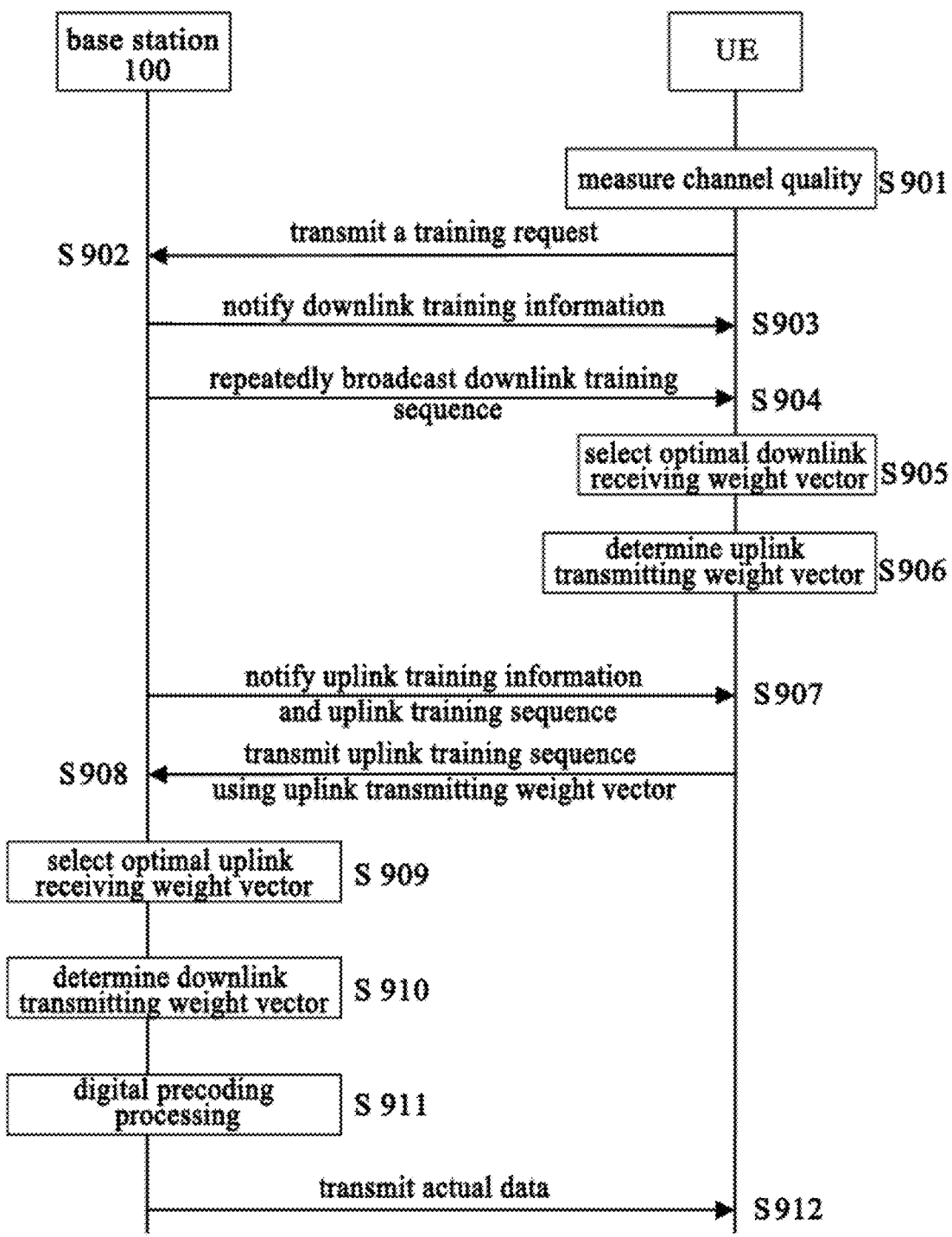
FIG. 9 is a flow chart of another example of beamforming training in the present disclosure.

The beamforming training processing shown in FIG. 6 may be applied to a periodic training between the base station 100 and the user equipment (UE), that is, the base station 100 periodically notifies the user equipment (UE) of downlink training information (as described in step S601), so as to start the training process. FIG. 9 shows a beamforming training process in non-periodic training.

As shown in FIG. 9, the user equipment 100 measures channel quality in step S901. In a case that the measured channel quality is lower than a predetermined threshold, the user equipment 100 transmits a training request to the base station 100 in step S902. In response to the request from the user equipment (UE), similar to step S601, the base station 100 broadcasts downlink training information to the user equipment in step S903, so as to start training process. Subsequent steps S904 to S912 are the same as steps S602 to S610 in FIG. 6, which thus are omitted here.

The embodiments of the present disclosure are described in detail above in conjunction with the drawings. According to the present disclosure, a base station broadcasts a downlink training sequence in a downlink training process, and all user equipments can participate in the training simultaneously. The required number of probing pairs (NPP) is P, and P is the size of beamforming codebook in the user equipment. In an uplink training process, all user equipments having orthogonal uplink training sequences may participate in the training simultaneously, and $K_{RF}$ radio frequency links provided to the base station may simultaneously estimate equivalent channels for different codewords. As such, the required number of probing pairs is $Q/K_{RF}$, where Q is the size of beamforming codebook in the base station. Therefore, the overall complexity of the beamforming training mechanism in the present disclosure is $Q/K_{RF}+P$, and the complexity is not increased with the increase in the number of the users. Therefore, the beamforming training mechanism in the present disclosure is suitable to the multi-user millimeter-wave communication system. In addition, a feedback operation of the user equipment with respect to the base station is not required in the beamforming training mechanism of the present disclosure.

Figure 10A:
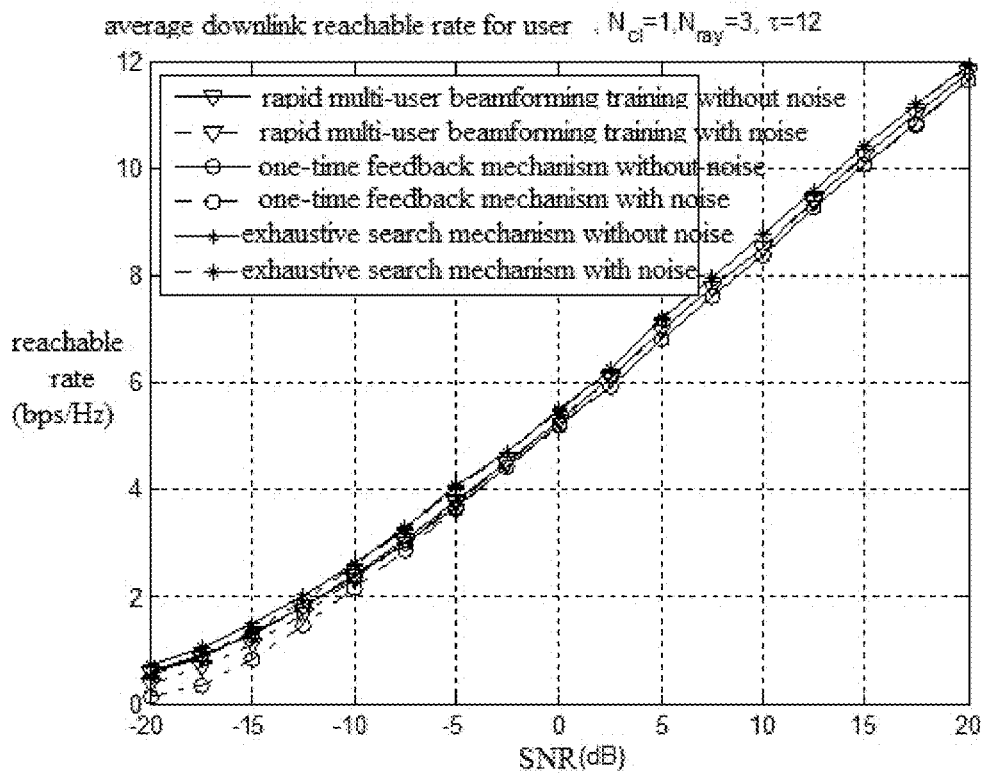
FIG. 10A and FIG. 10B shows performance comparison between the beamforming training in the present disclosure and the conventional technology.
Figure 10B:
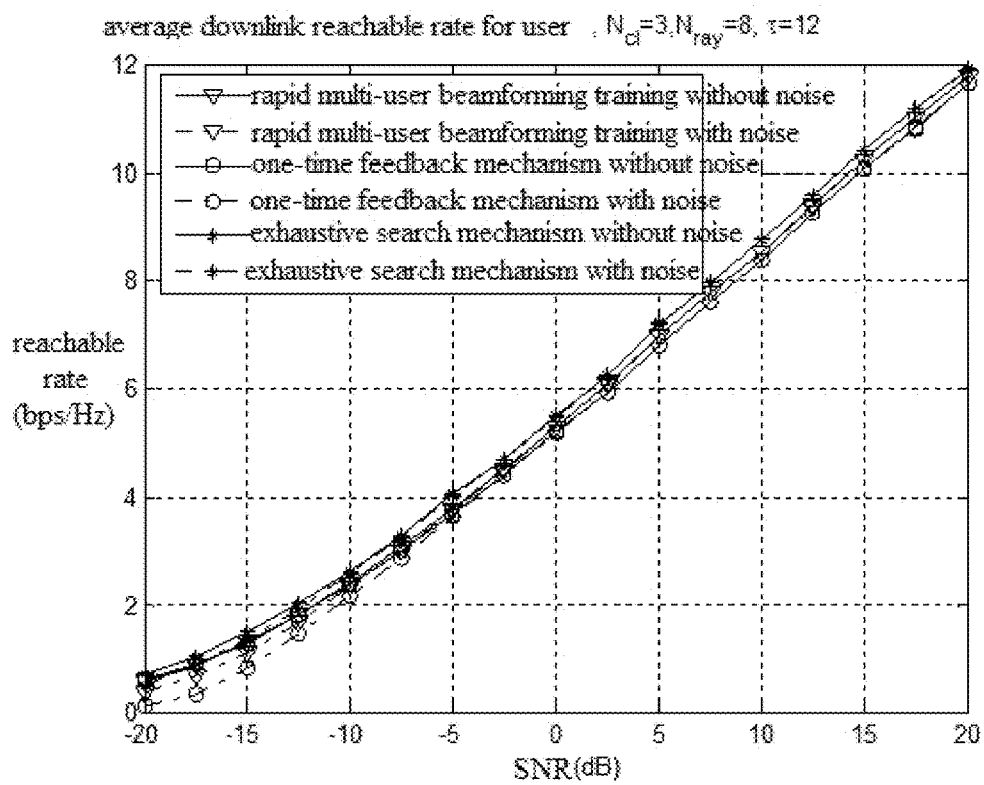

FIG. 10A and FIG. 10B show average downlink reachable rates of the users implemented by the rapid multi-user beamforming training mechanism in the present disclosure, the existing exhaustive search mechanism and the existing one-time feedback mechanism under different channel conditions. In FIG. 10A and FIG. 10B, the abscissa denotes signal-to-noise ratio, the ordinate denotes average downlink reachable rate, $N_{cl}$ denotes the number of scattering clusters in a channel, $N_{ray}$ denotes the number of sub-paths included in each scattering cluster, $\tau$ denotes length of a training sequence. It can be seen from FIG. 10A and FIG. 10B that in a case that the number of scattering objects in the millimeter-wave channel is small (that is, the channel is sparse), performance of the rapid multi-user beamforming training mechanism and the one-time feedback mechanism almost approaches to the optimal performance of the exhaustive search mechanism. With the increase in the number of scattering objects in the channel, there is small performance loss in the rapid multi-user beamforming training mechanism and the one-time feedback mechanism, but performance of the beamforming training mechanism of the present disclosure is still better than performance of the one-time feedback mechanism. In addition, with the increase of the signal-to-noise ratio, the performance of the beamforming training mechanism of the present disclosure in a noise environment rapidly converges to the performance in a noise-free environment, that is, an upper limit of performance of the beamforming training mechanism.

The present disclosure can be applied into various products. For example, the base station in the embodiments described above may be implemented as any type of evolved node B (eNB), such as macro eNB and small eNB. The small eNB such as pico eNB, micro eNB and home (femto-cell) eNB may have a smaller coverage than a macro cell. Alternatively, the base station may also be implemented as any other type of base station, such as NodeB and base transceiver station (BTS). The base station may include a body (also referred to as base station device) configured to control wireless communication; and one or more remote radio heads (RRHs) arranged in a different location from the body. In addition, various types of terminals may operate as a base station by temporarily or semi-persistently executing the function of the base station.

In another aspect, the user equipment in the embodiments described above may be implemented as for example a communication terminal (such as smart phone, tablet personal computer (PC), laptop PC, portable game terminal, portable/dongle mobile router and digital camera device) or an on-board terminal (such as car navigation terminal). The user equipment may also be implemented as a terminal for performing machine-to-machine (M2M) communication, which is also referred to as machine type communication (MTC) terminal. In addition, the user equipment may be a wireless communication module (such as an integrated circuit module including a single wafer) installed on each terminal described above.

In addition, the processor in the present disclosure may be implemented as a baseband processor or a combination of a baseband processor and a general-purpose processor, for example, a central processing unit (CPU) or a digital signal processor (DSP).

The various devices or modules described herein may be only logical and do not strictly correspond to physical devices or assemblies. For example, a function of each of the modules described herein can be implemented by multiple physical entities, or, functions of multiple modules described herein may be implemented by a single physical entity. In addition, it should be noted that features, components, elements, steps or the like described in an embodiment are not limited to the embodiment, and may be applied into other embodiment, for example, may be substituted for or combined with particular features, components, elements, steps or the like in other embodiment.

A series of processing performed by each device or module in the above embodiments may be implemented with software, hardware or a combination thereof. Programs included in the software may be stored in, for example, a memory medium arranged inside or outside the device in advance. As an example, during execution, the programs are written into a random access memory (RAM) and are executed by a processor (such as CPU).

Figure 11:
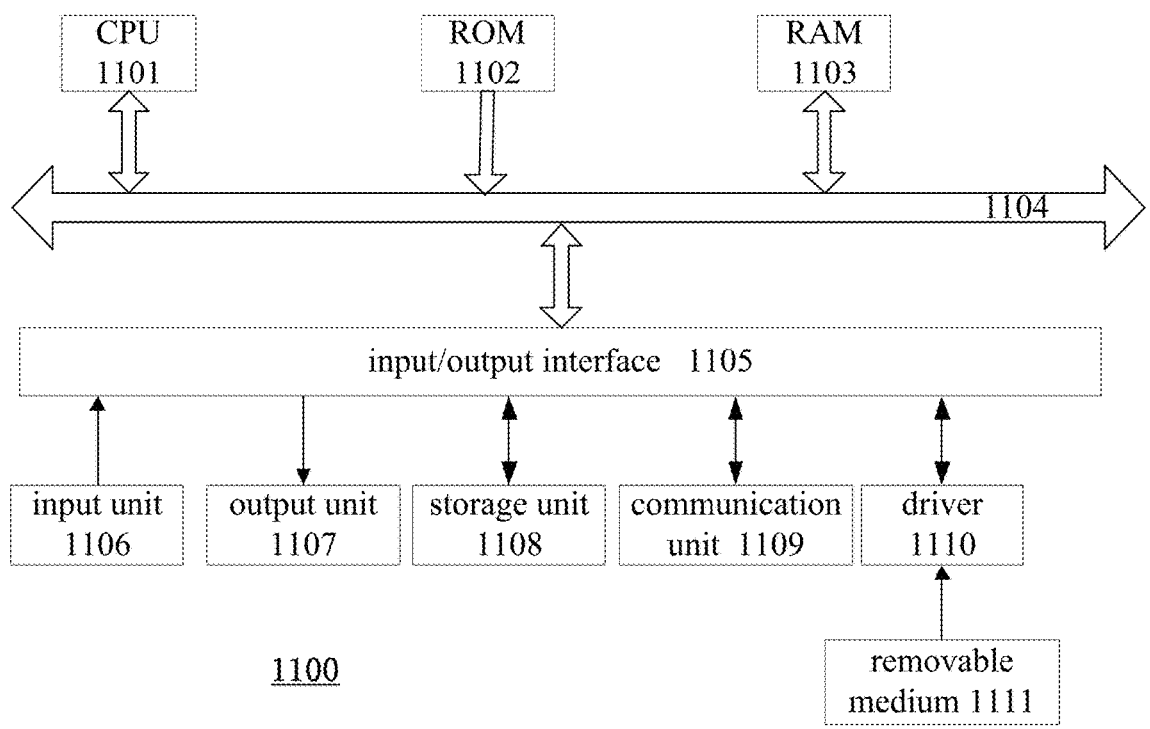
FIG. 11 is a block diagram showing exemplary configuration of computer hardware.

FIG. 11 is a block diagram showing an exemplary configuration of computer hardware for performing the above processing according to a program.

In a computer 1100, a central processing unit (CPU) 1101, a read only memory (ROM) 1102 and a random access memory (RAM) 1103 are connected with each other via a bus 1104.

An input/output interface 1105 is further connected to the bus 1104. The following components are connected to the input/output interface 1105: an input unit 1106 in the form of keyboard, mouse, microphone and the like; an output unit 1107 in the form of display, loudspeaker and the like; a storage unit 1108 in the form of hard disk, non-volatile memory and the like; a communication unit 1109 in the form of network interface card (such as Local area network (LAN) card and modem); and a driver 1110 for driving a removable medium 1111 such as magnetic disk, optical disk, magnetic optical disk or semiconductor memory.

In the computer having the above structure, the CPU 1101 loads the programs stored in the storage unit 1108 into the RAM 1103 via the input/output interface 1105 and the bus 1104, and executes the programs to perform the above series of processing.

The programs to be executed by the computer (CPU 1101) may be recorded on the removable medium 1111 which is package medium formed of magnetic disk (including floppy disk), compact disk (including compact disk read-only memory (CD-ROM), digital versatile disk (DVD) and the like), magneto optical disk or semiconductor memory for example. Alternatively, the programs to be executed by the computer (CPU 1101) may also be provided via wired or wireless transmission medium such as LAN, the Internet or digital satellite broadcasting.

In a case that the removable medium 1111 is mounted in the driver 1110, the programs may be loaded into the storage unit 1108 via the input/output interface 1105. In addition, the programs may be received by the communication unit 1109 via a wired or wireless transmission medium, and are loaded in the storage unit 1108. Alternatively, the programs can be previously loaded into the ROM 1102 or the storage unit 1108.

The programs to be executed by the computer may execute the processes in a sequence as described in the specification, or may execute the processes in parallel or execute the process when necessary (e.g., when being called).

The embodiments and technical effects of the present disclosure are described above in detail in conjunction with the drawings. However, the scope of the present disclosure is not limited thereto. It should be understood by those skilled in the art that, various modifications or changes can be made to the embodiments discussed herein without departing from the principle and spirit of the present disclosure, depending on design requirements and other factors. The scope of the present disclosure is defined by the appended claims or the equivalents thereof.

In addition, the present disclosure may be configured as follows.

A receiving-side device in a communication system includes one or more processors configured to: determine analog weight parameters for multiple antennas of the receiving-side device based on reception of a common sequence from a transmitting side by the receiving-side device; determining antenna configuration for transmitting a predetermined pilot signal corresponding to the receiving-side device based on the analog weight parameters, so as to transmit the predetermined pilot signal to the transmitting side.

The communication system includes multiple receiving-side devices, each of which has a predetermined pilot signal corresponding thereto, wherein respective predetermined pilot signals corresponding to respective receiving-side devices are orthogonal to one another.

The respective predetermined pilot signals corresponding to the respective receiving-side devices are transmitted to the transmitting side simultaneously.

The predetermined pilot signal is Sounding Reference Signal.

The predetermined pilot signal corresponding to the receiving-side device is configured for the receiving-side device by the transmitting side.

The analog weight parameters indicate a value pattern for multiple phase shifters connected with the multiple antennas.

The determining the analog weight parameters based on the reception of the common sequence from the transmitting side by the receiving-side device includes: setting values of the multiple phase shifters connected with the multiple antennas according to different value patterns, to receive the common sequence; and determining the analog weight parameters based on a pattern for the values of the multiple phase shifters, with which values a receiving quality of the common sequence meeting a predetermined condition can be obtained.

The common sequence is repeatedly transmitted by the transmitting side for several times in a first time period, and the one or more processors are further configured to, with respect to the common sequence in respective transmissions, set the values of the multiple phase shifters according to different value patterns, to respectively receive the common sequence in the respective transmissions.

The one or more processors are further configured to set the values of the multiple phase shifters based on the determined analog weight parameters, to transmit the predetermined pilot signal to the transmitting side for at least one time in a second time period.

The receiving-side device operates as a communication terminal, and the receiving-side device further includes: the multiple antennas configured to receive the common sequence and transmit the predetermined pilot signal; one or more radio frequency links configured to connect to the multiple antennas via the multiple phase shifters; and a storage configured to store a beamforming codebook, wherein the value pattern for a set of phase shifters connected with one radio frequency link corresponds to one codeword in the beamforming codebook, wherein the multiple antennas are further configured to receive a control instruction from the transmitting side, the control instruction including at least one of the following control parameters: the first time period, the number of times for repeatedly transmitting the common sequence, the second time period, and the number of times for transmitting the predetermined pilot signal, wherein the number of times for repeatedly transmitting the common sequence is related to a size of the beamforming codebook.

The value patterns for respective sets of phase shifters connected with respective radio frequency links are set in the same manner, to transmit the predetermined pilot signal to the transmitting side.

The one or more processors are further configured to determine the analog weight parameters in accordance to a criterion of maximizing power of a received signal or a criterion of maximizing Signal-to-Interference Ratio.

The one or more processors are further configured to correct the determined analog weight parameters, and determine the antenna configuration for transmitting the predetermined pilot signal based on the corrected analog weight parameters.

A transmitting-side device in a communication network includes one or more processors configured to: generate a common sequence to be transmitted to multiple receiving-side devices; with respect to each of the multiple receiving-side devices, determine analog weight parameters for multiple antennas of the transmitting-side device, based on reception of a predetermined pilot signal from the receiving-side device, wherein the predetermined pilot signal is transmitted by the receiving-side device based on multi-antenna transmitting weight parameters of the receiving-side device, and the multi-antenna transmitting weight parameters are determined by the receiving-side device based on reception of the common sequence.

The one or more processors are further configured to determine antenna configuration for transmitting data directed to the receiving-side device based on the determined analog weight parameters, to transmit the data to the receiving-side device.

The common sequence is broadcasted to the multiple receiving-side devices for several times.

The common sequence corresponds to Channel Status Information Reference Signal.

The analog weight parameters indicate a value pattern for multiple phase shifters connected with the multiple antennas of the transmitting-side device.

The determining analog weight parameters for the multiple antennas of the transmitting-side device based on the reception of the predetermined pilot signal from the receiving-side device includes: setting the values of the multiple phase shifters according to different value patterns, to receive the predetermined pilot signal; and determining the analog weight parameters based on a pattern for the values of the phase shifters, with which values a receiving quality of the predetermined pilot signal meeting a predetermined condition can be obtained.

The one or more processors are configured to perform control to repeatedly transmit the common sequence for several times in a first time period, such that the receiving-side device determines the multi-antenna transmitting weight parameters based on the reception of the common sequence transmitted for several times.

The one or more processors are configured to, with respect to the predetermined pilot signal transmitted by the receiving-side device for at least one time in a second time period, set the values of the multiple phase shifters according to different value patterns, to respectively receive the predetermined pilot signals in respective transmissions.

The transmitting-side device operates as a base station, and the transmitting-side device further includes: the multiple antennas configured to transmit the common sequence and receive the predetermined pilot signal; multiple radio frequency links configured to connect to the multiple antennas via the multiple phase shifters; and a storage configured to store a beamforming codebook, wherein the value pattern for a set of phase shifters connected with one radio frequency link corresponds to one codeword in the beamforming codebook, wherein the one or more processors are further configured to generate a control instruction for the receiving-side device, the control instruction including at least one of the following control parameters: the first time period, the number of times for repeatedly transmitting the common sequence, the second time period, and the number of times for transmitting the predetermined pilot signal, and wherein the number of times for repeatedly transmitting the predetermined pilot signal is related to a size of the beamforming codebook.

The one or more processors are configured to correct the determined analog weight parameters, and determine the antenna configuration for transmitting the data based on the corrected analog weight parameters.

A receiving-side device in a communication system includes: an analog weight parameter determining module configured to determine analog weight parameters for multiple antennas of the receiving-side device based on reception of a common sequence from a transmitting side by the receiving-side device; an antenna configuring module configured to determine antenna configuration for transmitting a predetermined pilot signal corresponding to the receiving-side device based on the analog weight parameters, so as to transmit the predetermined pilot signal to the transmitting side.

The analog weight parameter determining module is further configured to: set values of the multiple phase shifters connected with the multiple antennas according to different value patterns, to receive the common sequence; and determine the analog weight parameters based on a pattern for the values of the multiple phase shifters, with which values a receiving quality of the common sequence meeting a predetermined condition can be obtained.

The common sequence is repeatedly transmitted by the transmitting side for several times, and the analog weight parameter determining module is further configured to, with respect to the common sequence in respective transmissions, set the values of multiple phase shifters according to different value patterns, to respectively receive the common sequences in the respective transmissions.

The antenna configuring module is further configured to set the values of the multiple phase shifters based on the determined analog weight parameters, to transmit the predetermined pilot signal to the transmitting side for at least one time.

The antenna configuring module is further configured to set value patterns for respective sets of phase shifters connected with respective radio frequency links in the same manner, to transmit the predetermined pilot signal to the transmitting side.

The analog weight parameter determining module is further configured to determine the analog weight parameters in accordance to a criterion of maximizing power of a received signal or a criterion of maximizing a Signal-to-Interference Ratio.

The receiving-side device further includes a correcting module configured to correct the determined analog weight parameters, and the antenna configuring module is further configured to determine the antenna configuration for transmitting the predetermined pilot signal based on the corrected analog weight parameters.

A transmitting-side device in a communication network includes: a common sequence generating module configured to generate a common sequence to be transmitted to multiple receiving-side devices; an analog weight parameter determining module configured to, with respect to each of the multiple receiving-side devices, determine analog weight parameters for multiple antennas of the transmitting-side device, based on reception of a predetermined pilot signal from the receiving-side device, wherein the predetermined pilot signal is transmitted by the receiving-side device based on multi-antenna transmitting weight parameters of the receiving-side device, and the multi-antenna transmitting weight parameters are determined by the receiving-side device based on reception of the common sequence.

The transmitting-side device further includes an antenna configuring module configured to determine antenna configuration for transmitting data directed to the receiving-side device based on the determined analog weight parameters, to transmit the data to the receiving-side device.

The analog weight parameter determining module is further configured to set the values of the multiple phase shifters according to different value patterns, to receive the predetermined pilot signal; and determine the analog weight parameters based on a pattern for the values of the phase shifters, with which values a receiving quality of the predetermined pilot signal meeting a predetermined condition can be obtained.

The analog weight parameter determining module is further configured to, with respect to the predetermined pilot signal transmitted by the receiving-side device for at least one time, set the values of the multiple phase shifters according to different value patterns, to respectively receive the predetermined pilot signals in respective transmissions.

The transmitting-side device further includes a control instruction generating module configured to generate a control instruction for the receiving-side device, wherein the control instruction includes at least one of the following control parameters: a time period for transmitting the common sequence, the number of times for repeatedly transmitting the common sequence, a time period for transmitting the predetermine pilot signal, and the number of times for transmitting the predetermined pilot signal.

The transmitting-side device further includes a correcting module configured to correct the determined analog weight parameters, and the antenna configuring module is further configured to determine the antenna configuration for transmitting the data based on the corrected analog weight parameters.

A training method in a communication system includes: generating, by a transmitting-side device, a common sequence to be transmitted to multiple receiving-side devices; determining, by each of the multiple receiving-side devices, first analog weight parameters based on reception of the common sequence; determining, by each of the multiple receiving-side devices, antenna configuration for transmitting a predetermined pilot signal corresponding to the receiving-side device based on the determined first analog weight parameters, to transmit the predetermined pilot signal to the transmitting-side device; determining, by the transmitting-side device, second analog weight parameters for the receiving-side device based on reception of the predetermined pilot signal; and determining, by the transmitting-side device, antenna configuration for transmitting data directed to the receiving-side device based on the determined second analog weight parameters, to transmit the data to the receiving-side device.

The invention claimed is:

1. A User Equipment (UE) with a plurality of antennas in a communication system, comprising one or more processors configured to:
   determine, based on reception of channel state information reference signal (CSI-RS) from a Base Station (BS) in the communication system, a downlink receiving beam, the downlink receiving beam indicating a value pattern of a plurality of phase shifters connected with the plurality of antennas, and being determined in accordance to a criterion of maximizing received signal power or a criterion of maximizing Signal-to-Interference Ratio; and
   determine, based on the downlink receiving beam, an uplink transmitting beam for transmitting Sounding Reference Signal (SRS) corresponding to the UE so as to transmit the SRS to the BS,
   wherein the plurality of antennas are configured to receive one or more control instructions from the BS,
   wherein the one or more processors are further configured to acquire at least one of the following information based on the one or more control instructions: the first period of time of transmitting the CSI-RS, the number of times for transmitting the CSI-RS, the second period of time of transmitting the SRS, or the number of times for transmitting the SRS.

2. The UE according to claim 1, wherein the one or more processors is further configured to:
   receive the CSI-RS with a plurality of receiving beams;
   determine, from the plurality of receiving beams, the downlink receiving beam with receiving quality of the CSI-RS satisfying a predetermined condition.

3. The UE according to claim 2, wherein the CSI-RS is repetitively transmitted by the BS for several times within the first period of time,
   wherein the one or more processors are further configured to, with respect to the CSI-RS transmitted in respective transmissions, respectively receive the CSI-RS transmitted in the respective transmissions with different receiving beams.

4. The UE according to claim 3, wherein the UE further comprising:
   the plurality of antennas configured to receive the common sequence and transmit the predetermined pilot signal;
   one or more Radio Frequency (RF) links configured to be connected to the plurality of antennas via the plurality of phase shifters; and
   a storage configured to store a beamforming codebook,
   wherein the value pattern of a set of phase shifters connected with one RF link corresponds to one codeword in the beamforming codebook,
   wherein the number of times for repetitively transmitting the CSI-RS is related to the size of the beamforming codebook.

5. The UE according to according to claim 4, wherein the value patterns of respective sets of phase shifters connected with respective RF links are set in the same manner so as to transmit the SRS to the BS.

6. The UE according to claim 1, wherein the one or more processors is further configured to:
   set values of the plurality of phase shifters connected with the plurality of antennas according to different value patterns, so as to receive the CSI-RS with the plurality of receiving beams, and
   determine the downlink receiving beam based on the pattern of the values of the plurality of phase shifters, with which values the receiving quality of the CSI-RS satisfying a predetermined condition can be obtained.

7. The UE according to claim 1, wherein the one or more processors are further configured to set the values of the plurality of phase shifters based on the determined downlink receiving weight vector, so as to transmit the SRS to the BS for at least one time within the second period of time.

8. The UE according to claim 1, wherein the one or more processors are further configured to determine the uplink transmitting beam with corresponding spacial direction to the downlink receiving beam.

9. A method for a User Equipment (UE) with a plurality of antennas in a communication system, comprising:
    determining, based on reception of channel state information reference signal (CSI-RS) from a Base Station (BS) in the communication system, a downlink receiving beam, the downlink receiving beam indicating a value pattern of a plurality of phase shifters connected with the plurality of antennas, and being determined in accordance to a criterion of maximizing received signal power or a criterion of maximizing Signal-to-Interference Ratio;
    determining, based on the downlink receiving beam, an uplink transmitting beam for transmitting Sounding Reference Signal (SRS) corresponding to the UE so as to transmit the SRS to the BS; and
    acquiring at least one of the following information based on one or more control instructions, the one or more control instructions being received from the BS by the plurality of antennas: the first period of time of transmitting the CSI-RS, the number of times for transmitting the CSI-RS, the second period of time of transmitting the SRS, or the number of times for transmitting the SRS.

10. A non-transitory computer-readable storage medium encoded with instructions, which, when executed by a User Equipment (UE), cause the User Equipment (UE) with a plurality of antennas in a communication system to execute a process, the process comprising:
    determining, based on reception of channel state information reference signal (CSI-RS) from a Base Station (BS) in the communication system, a downlink receiving beam, the downlink receiving beam indicating a value pattern of a plurality of phase shifters connected with the plurality of antennas, and being determined in accordance to a criterion of maximizing received signal power or a criterion of maximizing Signal-to-Interference Ratio;
    determining, based on the downlink receiving beam, an uplink transmitting beam for transmitting Sounding Reference Signal (SRS) corresponding to the UE so as to transmit the SRS to the BS; and
    acquiring at least one of the following information based on one or more control instructions, the one or more control instructions being received from the BS by the plurality of antennas: the first period of time of transmitting the CSI-RS, the number of times for transmitting the CSI-RS, the second period of time of transmitting the SRS, or the number of times for transmitting the SRS.

11. The non-transitory computer-readable storage medium according to claim 10, wherein further comprising:
    receiving the CSI-RS with a plurality of receiving beams; and
    determining, from the plurality of receiving beams, the downlink receiving beam with receiving quality of the CSI-RS satisfying a predetermined condition.

12. The non-transitory computer-readable storage medium according to claim 11, wherein the CSI-RS is repetitively transmitted by the BS for several times within the first period of time,
    wherein the process further comprises, with respect to the CSI-RS transmitted in respective transmissions, respectively receiving the CSI-RS transmitted in the respective transmissions with different receiving beams.

13. The non-transitory computer-readable storage medium according to claim 12, wherein the UE comprises:
    the plurality of antennas configured to receive the common sequence and transmit the predetermined pilot signal;
    one or more Radio Frequency (RF) links configured to be connected to the plurality of antennas via the plurality of phase shifters; and
    a storage configured to store a beamforming codebook,
    wherein the value pattern of a set of phase shifters connected with one RF link corresponds to one codeword in the beamforming codebook,
    wherein the number of times for repetitively transmitting the CSI-RS is related to the size of the beamforming codebook.

14. The non-transitory computer-readable storage medium according to according to claim 13, wherein the value patterns of respective sets of phase shifters connected with respective RF links are set in the same manner so as to transmit the SRS to the BS.

15. The non-transitory computer-readable storage medium according to claim 10, wherein, further comprising:
    setting values of the plurality of phase shifters connected with the plurality of antennas according to different value patterns, so as to receive the CSI-RS with the plurality of receiving beams; and
    determining the downlink receiving beam based on the pattern of the values of the plurality of phase shifters, with which values the receiving quality of the CSI-RS satisfying a predetermined condition can be obtained.

16. The non-transitory computer-readable storage medium according to claim 10, wherein, further comprising:
    setting the values of the plurality of phase shifters based on the determined downlink receiving weight vector, so as to transmit the SRS to the BS for at least one time within the second period of time.

17. The non-transitory computer-readable storage medium according to claim 10, wherein, further comprising:
    determining the uplink transmitting beam with corresponding spacial direction to the downlink receiving beam.

18. A Base Station (BS) in a communication system, comprising one or more processors configured to:
    transmit one or more control instructions to a plurality of antennas of a User Equipment (UE) in the communication system; and
    transmit channel state information reference signal (CSI-RS) to the UE, the UE determining a downlink receiving beam which indicates a value pattern of a plurality of phase shifters connected with the plurality of antennas, based on the CSI-RS transmitted from the BS, in accordance to a criterion of maximizing received signal power or a criterion of maximizing Signal-to-Interference Ratio,
    wherein an uplink transmitting beam for transmitting Sounding Reference Signal (SRS) corresponding to the UE is determined by the UE so as to transmit the SRS to the BS, based on the downlink receiving beam,
    wherein the one or more control instructions includes at least one of the first period of time of transmitting the CSI-RS, the number of times for transmitting the CSI-RS, the second period of time of transmitting the SRS, or the number of times for transmitting the SRS.

19. The BS according to claim 18,
    wherein the CSI-RS is received by the UE with a plurality of receiving beams, and wherein, from the plurality of receiving beams, the downlink receiving beam with receiving quality of the CSI-RS satisfying a predetermined condition is determined by the UE.

20. The BS according to claim 19, wherein the one or more processors is configured to transmit the CSI-RS repetitively for several times within the first period of time,
wherein, with respect to the CSI-RS transmitted in respective transmissions, the CSI-RS is respectively received by the UE in the respective transmissions with different receiving beams.

21. The BS according to claim 20, wherein the UE further comprising:
the plurality of antennas configured to receive the common sequence and transmit the predetermined pilot signal;
one or more Radio Frequency (RF) links configured to be connected to the plurality of antennas via the plurality of phase shifters; and
a storage configured to store a beamforming codebook,
wherein the value pattern of a set of phase shifters connected with one RF link corresponds to one codeword in the beamforming codebook,
wherein the number of times for repetitively transmitting the CSI-RS is related to the size of the beamforming codebook.

22. The BS according to according to claim 21, wherein the value patterns of respective sets of phase shifters connected with respective RF links are set in the same manner so as to transmit the SRS to the BS.

23. The BS according to claim 18,
wherein values of the plurality of phase shifters connected with the plurality of antennas according to different value patterns are set by the UE, so as to receive the CSI-RS with the plurality of receiving beams, and
wherein the downlink receiving beam is determined by the UE, based on the pattern of the values of the plurality of phase shifters, with which values the receiving quality of the CSI-RS satisfying a predetermined condition can be obtained.

24. The BS according to claim 18, wherein the values of the plurality of phase shifters are set by the UE based on the determined downlink receiving weight vector, so as to transmit the SRS to the BS for at least one time within the second period of time.

25. The BS according to claim 18, wherein the uplink transmitting beam with corresponding spacial direction to the downlink receiving beam is determined by the UE.

26. A method for a Base Station (BS) in a communication system, comprising:
transmitting one or more control instructions to a plurality of antennas of a User Equipment (UE) in the communication system; and
transmitting channel state information reference signal (CSI-RS) to the UE, the UE determining a downlink receiving beam which indicates a value pattern of a plurality of phase shifters connected with the plurality of antennas, based on the CSI-RS transmitted from the BS, in accordance to a criterion of maximizing received signal power or a criterion of maximizing Signal-to-Interference Ratio,
wherein an uplink transmitting beam for transmitting Sounding Reference Signal (SRS) corresponding to the UE is determined by the UE so as to transmit the SRS to the BS, based on the downlink receiving beam,
wherein the one or more control instructions includes at least one of the first period of time of transmitting the CSI-RS, the number of times for transmitting the CSI-RS, the second period of time of transmitting the SRS, or the number of times for transmitting the SRS.

27. A non-transitory computer-readable storage medium encoded with instructions, which, when executed by a Base Station (BS) in a communication system, cause the BS to execute a process, the process comprising:
transmitting one or more control instructions to a plurality of antennas of a User Equipment (UE) in the communication system; and
transmitting channel state information reference signal (CSI-RS) to the UE, the UE determining a downlink receiving beam which indicates a value pattern of a plurality of phase shifters connected with the plurality of antennas, based on the CSI-RS transmitted from the BS, in accordance to a criterion of maximizing received signal power or a criterion of maximizing Signal-to-Interference Ratio,
wherein an uplink transmitting beam for transmitting Sounding Reference Signal (SRS) corresponding to the UE is determined by the UE so as to transmit the SRS to the BS, based on the downlink receiving beam,
wherein the one or more control instructions includes at least one of the first period of time of transmitting the CSI-RS, the number of times for transmitting the CSI-RS, the second period of time of transmitting the SRS, or the number of times for transmitting the SRS.

28. The non-transitory computer-readable storage medium according to claim 27,
wherein the CSI-RS is received by the UE with a plurality of receiving beams, and
wherein, from the plurality of receiving beams, the downlink receiving beam with receiving quality of the CSI-RS satisfying a predetermined condition is determined by the UE.

29. The non-transitory computer-readable storage medium according to claim 28, wherein the process further comprises, transmitting the CSI-RS repetitively for several times within the first period of time, and
wherein, with respect to the CSI-RS transmitted in respective transmissions, the CSI-RS is respectively received by the UE in the respective transmissions with different receiving beams.

30. The non-transitory computer-readable storage medium according to claim 29, wherein the UE comprises:
the plurality of antennas configured to receive the common sequence and transmit the predetermined pilot signal;
one or more Radio Frequency (RF) links configured to be connected to the plurality of antennas via the plurality of phase shifters; and
a storage configured to store a beamforming codebook,
wherein the value pattern of a set of phase shifters connected with one RF link corresponds to one codeword in the beamforming codebook,
wherein the number of times for repetitively transmitting the CSI-RS is related to the size of the beamforming codebook.

31. The non-transitory computer-readable storage medium according to according to claim 30, wherein the value patterns of respective sets of phase shifters connected with respective RF links are set in the same manner so as to transmit the SRS to the BS.

32. The non-transitory computer-readable storage medium according to claim 27,
wherein values of the plurality of phase shifters connected with the plurality of antennas according to different value patterns are set by the UE, so as to receive the CSI-RS with the plurality of receiving beams, and wherein the downlink receiving beam is determined by the UE, based on the pattern of the values of the plurality of phase shifters, with which values the receiving quality of the CSI-RS satisfying a predetermined condition can be obtained.

33. The non-transitory computer-readable storage medium according to claim 27, wherein the values of the plurality of phase shifters are set by the UE based on the determined downlink receiving weight vector, so as to transmit the SRS to the BS for at least one time within the second period of time.

34. The non-transitory computer-readable storage medium according to claim 27, wherein the uplink transmitting beam with corresponding spacial direction to the downlink receiving beam is determined by the UE.

* * * * *